(12) United States Patent
Kawasaki et al.

(10) Patent No.: US 8,087,907 B2
(45) Date of Patent: Jan. 3, 2012

(54) TURBO VACUUM PUMP

(75) Inventors: Hiroyuki Kawasaki, Tokyo (JP); Toshimitsu Barada, Tokyo (JP)

(73) Assignee: Ebara Corporation, Tokyo (JP)

( * ) Notice: Subject to any disclaimer, the term of this patent is extended or adjusted under 35 U.S.C. 154(b) by 498 days.

(21) Appl. No.: 12/410,720

(22) Filed: Mar. 25, 2009

(65) Prior Publication Data
US 2009/0246048 A1 Oct. 1, 2009

(30) Foreign Application Priority Data

Mar. 26, 2008 (JP) ................... 2008-079536
Apr. 17, 2008 (JP) ................... 2008-107878

(51) Int. Cl.
*F04B 37/14* (2006.01)

(52) U.S. Cl. ................ 417/423.4; 415/110; 415/142

(58) Field of Classification Search ............. 417/423.1, 417/423.4, 423.12, 423.14, 423.15; 415/104–107, 415/110–113, 142, 170.1
See application file for complete search history.

(56) References Cited

U.S. PATENT DOCUMENTS

| 3,399,827 | A | * | 9/1968 | Schwartzman | 417/406 |
| 5,695,316 | A | * | 12/1997 | Schutz et al. | 415/90 |
| 7,338,262 | B2 | * | 3/2008 | Gozdawa | 417/423.8 |

FOREIGN PATENT DOCUMENTS

| JP | 01142594 A | * | 6/1989 |
| JP | 6-193586 A | | 7/1994 |
| JP | 2002-285987 A | | 10/2002 |

* cited by examiner

*Primary Examiner* — Joseph L Williams
*Assistant Examiner* — Nathaniel Lee
(74) *Attorney, Agent, or Firm* — Westerman, Hattori, Daniels & Adrian, LLP

(57) ABSTRACT

An oil-free turbo vacuum pump is capable of evacuating gas in a chamber from atmospheric pressure to high vacuum. The turbo vacuum pump includes a pumping section having rotor blades and stator blades which are disposed alternately in a casing, and a main shaft for supporting the rotor blades. A gas bearing is used as a bearing for supporting the main shaft in a thrust direction, spiral grooves are formed in both surfaces of a stationary part of the gas bearing, and the stationary part having the spiral grooves is placed between an upper rotating part and a lower rotating part which are fixed to the main shaft. A thrust magnetic bearing for canceling out a thrust force generated by the differential pressure between a discharge side and an intake side by an evacuation action of the pumping suction is provided.

28 Claims, 21 Drawing Sheets direction of rotation direction of rotation

TURBO VACUUM PUMP

BACKGROUND OF THE INVENTION

1. Field of the Invention

The present invention relates to a turbo vacuum pump, and more particularly to an oil-free turbo vacuum pump which is capable of evacuating gas in a chamber from atmospheric pressure to high vacuum.

2. Description of the Related Art

Conventionally, in a semiconductor fabrication apparatus or the like, turbo vacuum pumps have been used for evacuating gas in a chamber to develop clean high vacuum (or ultra-high vacuum). These turbo vacuum pumps include a type of vacuum pump in which a turbo-molecular pump stage, a thread groove pump stage and a vortex pump stage are disposed in series in a pump casing having an intake port and a discharge port, and a main shaft to which rotor blades of these pump stages are fixed is supported by a hydrostatic gas bearing, a type of vacuum pump in which multiple pump stages are disposed in a pump casing having an intake port and a discharge port, and a main shaft to which rotor blades of the pump stages are fixed is supported by a hydrodynamic radial gas bearing, and a thrust bearing comprising a hydrodynamic thrust gas bearing and a permanent magnet, and other types of vacuum pumps. In this manner, the main shaft is supported by the gas bearing without using a rolling bearing to construct an oil-free turbo vacuum pump which does not require oil in the entirety of the pump including gas passages and bearing portions.

In the vacuum pump which is capable of compressing gas from ultra-high vacuum to atmospheric pressure, in order to reduce a flow rate of countercurrent flow of gas and improve compression capability, it is necessary to make blade clearance minute at a pressure close to atmospheric pressure. Further, when gas is compressed from ultra-high vacuum to atmospheric pressure, a thrust load acts on a rotor by the pressure differential. Thus, in the turbo vacuum pump, mechanical ball bearings are employed as a bearing for supporting the rotor having rotor blades of a pump stage. However, because physical contact occurs in the mechanical ball bearing, the rotor cannot be rotated at high speed. Besides the ball bearing, a gas bearing is used as a bearing for rotatably supporting the rotor with an accuracy of several micron meters (µm) to several tens of micron meters (µm). The turbo vacuum pump in which a rotor having rotor blades of a pump stage is supported by the gas bearing is disclosed in Japanese laid-open patent publication No. 2002-285987 or Japanese laid-open patent publication No. 6-193586, for example.

However, in order to generate a load equivalent to a thrust load caused by the pressure differential from the ultra-high vacuum to atmospheric pressure using the gas bearing disclosed in Japanese laid-open patent publication No. 2002-285987 or Japanese laid-open patent publication No. 6-193586, it is necessary to make the clearance of the gas bearing narrower, thus reaching the limit of part accuracy or the limit of machining and dimensional measurement. Specifically, it is difficult to manufacture a gas bearing having an extremely small clearance from the aspects of machining and measurement.

Further, in the case where a repulsive force of permanent magnet is utilized for canceling out the thrust load as disclosed in Japanese laid-open patent publication No. 6-193586, as clearance between the permanent magnet and an object facing the permanent magnet is narrower, the repulsive force of the permanent magnet becomes stronger. However, such repulsive force (i.e. clearance) cannot be controlled, and thus the thrust position of the rotor cannot be controlled.

SUMMARY OF THE INVENTION

The present invention has been made in view of the above drawbacks. It is therefore an object of the present invention to provide a turbo vacuum pump which can compress gas from high vacuum to atmospheric pressure, can support a rotor rotatably at high speed and with high accuracy, and can be manufactured inexpensively.

In order to achieve the object of the present invention, according to a first aspect of the present invention, there is provided a turbo vacuum pump comprising: a casing; a pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a stationary part of the gas bearing, and the stationary part having the spiral grooves is placed between an upper rotating part and a lower rotating part which are fixed to the main shaft; and wherein a thrust magnetic bearing for canceling out a thrust force generated by the differential pressure between a discharge side and an intake side by an evacuation action of the pumping suction is provided, and a displacement sensor for measuring an axial displacement of a rotor having the main shaft is provided.

In a preferred aspect of the present invention, the displacement sensor is provided in the vicinity of the gas bearing.

According to another aspect of the present invention, there is provided a turbo vacuum pump comprising: a casing; a pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a rotating part of the gas bearing fixed to the main shaft, and the rotating part having the spiral grooves is placed between an upper stationary part and a lower stationary part; and wherein a thrust magnetic bearing for canceling out a thrust force generated by the differential pressure between a discharge side and an intake side by an evacuation action of the pumping suction is provided, and a displacement sensor for measuring an axial displacement of a rotor having the main shaft is provided.

In a preferred aspect of the present invention, the displacement sensor is provided in the vicinity of the gas bearing.

According to the first aspect of the present invention, because the gas bearing is used as a bearing for supporting the rotor including the main shaft and the rotor blades fixed to the main shaft in a thrust direction, the rotor can be rotatably supported in an axial direction of the rotor with an accuracy of several micron meters (µm) to several tens of micron meters (µm). If the rotor is axially displaced due to a thrust force caused by differential pressure generated by a compression action of the pump, the rotor cannot be stably rotated due to the contact in the minute clearance portion of the gas bearing. In order to prevent such trouble from occurring, the displacement of the rotor is detected by a displacement sensor provided in the vicinity of the gas bearing. Then, the thrust magnetic bearing for canceling out the thrust force generated by the differential pressure attracts the rotor, thereby rotating the rotor stably.

In the case where the repulsive force of the permanent magnet is utilized for canceling out the thrust load, as clearance between the permanent magnet and an object facing the permanent magnet is narrower, the repulsive force of the permanent magnet becomes stronger. However, such repulsive force (i.e. clearance) cannot be controlled, and thus the thrust position of the rotor cannot be controlled. Therefore, the rotor is rotated at the position where the repulsive force of the gas bearing, the thrust force caused by the differential pressure, the repulsive force of the permanent magnet, and the deadweight of the rotor balance. In the method in which the permanent magnet is used, the blade clearance is affected by an accuracy of each component for generating the thrust force, and variation in evacuation performance tends to occur.

According to the present invention, the thrust magnetic bearing for canceling out the thrust force caused by the differential pressure is provided, and thus at least one element which is capable of being controlled is added to the construction for generating the thrust force. Accordingly, the position of the rotor in the thrust direction can be controlled with high accuracy, and performance of the pump can be stabilized.

In a preferred aspect of the present invention, the displacement sensor comprises an eddy current sensor or an inductive sensor.

In a preferred aspect of the present invention, surface treatment composed of a conductive material or a magnetic material is applied to a target area of the rotor targeted by the displacement sensor.

In a preferred aspect of the present invention, a thin plate composed of a conductive material or a magnetic material is provided in a target area of the rotor targeted by the displacement sensor.

According to the present invention, in the case where the rotor part as a target of the displacement sensor is composed of ceramics, if the displacement sensor comprises an eddy current sensor or an inductive sensor, then the displacement sensor cannot detect the target. Thus, if the displacement sensor comprises an eddy current sensor, surface treatment composed of a conductive material should be applied to the target area. If the displacement sensor comprises an inductive sensor, surface treatment composed of a magnetic material should be applied to the target area. Further, a thin plate composed of a conductive material or a magnetic material may be provided on the rotor part as a target of the displacement sensor.

According to a second aspect of the present invention, there is provided a turbo vacuum pump comprising: a casing; a pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a stationary part of the gas bearing, and the stationary part having the spiral grooves is placed between an upper rotating part and a lower rotating part which are fixed to the main shaft; and wherein a thrust magnetic bearing for canceling out a thrust force generated by the differential pressure between a discharge side and an intake side by an evacuation action of the pumping suction is provided, and a vacuum gauge for measuring vacuum pressure in at least one of a pump intake port and an interior of the pump is provided.

According to another aspect of the present invention, there is provided a turbo vacuum pump comprising: a casing; a pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a rotating part of the gas bearing fixed to the main shaft, and the rotating part having the spiral grooves is placed between an upper stationary part and a lower stationary part; and wherein a thrust magnetic bearing for canceling out a thrust force generated by the differential pressure between a discharge side and an intake side by an evacuation action of the pumping suction is provided, and a vacuum gauge for measuring vacuum pressure in at least one of a pump intake port and an interior of the pump is provided.

According to the second aspect of the present invention, because the gas bearing is used as a bearing for supporting the rotor including the main shaft and the rotor blades fixed to the main shaft in a thrust direction, the rotor can be rotatably supported in an axial direction of the rotor with an accuracy of several micron meters ($\mu m$) to several tens of micron meters ($\mu m$). If the rotor is axially displaced due to a thrust force generated by differential pressure caused by a compression action of the pump, the rotor cannot be stably rotated due to the contact in the minute clearance portion of the gas bearing. In order to prevent such trouble from occurring, the differential pressure between the discharge side and the intake side in the pumping section is measured by the vacuum gauge provided at the pump intake port or the interior of the pump, and measurement values are inputted into the control section of the thrust magnetic bearing, and then the thrust magnetic bearing for canceling out the thrust force generated by the differential pressure attracts the rotor, thereby rotating the rotor stably.

In a preferred aspect of the present invention, the vacuum gauge comprises a diaphragm gauge, an ionization gauge or a Pirani gauge.

In a preferred aspect of the present invention, a displacement sensor for measuring an axial displacement of the main shaft is provided in the vicinity of the thrust magnetic bearing.

As the thrust magnetic bearing is closer to the object to be attracted (magnetic clearance is smaller), the magnetic attractive force becomes larger. When the vacuum pump is rotated at high speed, the main shaft extends in a thrust direction by heat generation at the high-frequency motor part. In the case where the main shaft extends in the thrust direction, even if the same controlled variable is inputted into the thrust magnetic bearing, the produced thrust forces differ depending on the magnetic clearance of the thrust magnetic bearing. Therefore, the displacement sensor for measuring displacement (thermal deformation quantity) of the main shaft 1 in the thrust direction is provided in the vicinity of the thrust magnetic bearing. Accordingly, the produced thrust load is corrected based on changed portion of the magnetic clearance caused by deformation of the main shaft, thereby suppressing the generation of excessive thrust force. As a method for detecting displacement of the main shaft in the thrust direction, besides the method of using the displacement sensor, the temperature of the motor or the radial magnetic bearing is measured to calculate thermal deformation quantity of the main shaft in the thrust direction.

According to a third aspect of the present invention, there is provided a turbo vacuum pump comprising: a casing; a pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a stationary part of the gas bearing, and the stationary part having the spiral grooves is placed between an upper rotating part and a lower rotating part which are fixed to the main shaft; and wherein a thrust magnetic bearing for canceling out a thrust force generated by the differential pressure between a discharge side and an intake side by an evacuation action of the pumping suction is provided, and a vacuum pressure measured by a vacuum gauge provided at a pump intake side is inputted into a control section of the thrust magnetic bearing.

According to another aspect of the present invention, there is provided a turbo vacuum pump comprising: a casing; a pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a rotating part of the gas bearing fixed to the main shaft, and the rotating part having the spiral grooves is placed between an upper stationary part and a lower stationary part; and wherein a thrust magnetic bearing for canceling out a thrust force generated by the differential pressure between a discharge side and an intake side by an evacuation action of the pumping suction is provided, and a vacuum pressure measured by a vacuum gauge provided at a pump intake side is inputted into a control section of the thrust magnetic bearing.

According to the third aspect of the present invention, because the gas bearing is used as a bearing for supporting the rotor including the main shaft and the rotor blades fixed to the main shaft in a thrust direction, the rotor can be rotatably supported in an axial direction of the rotor with an accuracy of several micron meters (μm) to several tens of micron meters (μm). If the rotor is axially displaced due to a thrust force generated by differential pressure caused by a compression action of the pump, the rotor cannot be stably rotated due to the contact in the minute clearance portion of the gas bearing. In order to prevent such trouble from occurring, the differential pressure between the discharge side and the intake side in the pumping section is measured by the vacuum gauge provided at the pump intake side such as a vacuum chamber, and measurement values are inputted into the control section of the thrust magnetic bearing, and then the thrust magnetic bearing for canceling out the thrust force generated by the differential pressure attracts the rotor, thereby rotating the rotor stably.

According to a fourth aspect of the present invention, there is provided a turbo vacuum pump comprising: a casing; a blade pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a stationary part of the gas bearing, and the stationary part having the spiral grooves is placed between an upper rotating part and a lower rotating part which are fixed to the main shaft; and wherein a centrifugal blade element for compressing and evacuating gas in a radial direction is formed on at least one of a surface of the lower rotating part having an opposite surface which faces the spiral grooves of the stationary part and a surface of the stator blade which faces the lower rotating part in an axial direction.

According to the fourth aspect of the present invention, because the gas bearing is used as a bearing for supporting the rotor including the main shaft and the rotor blades fixed to the main shaft in a thrust direction, the rotor can be rotatably supported in an axial direction of the rotor with an accuracy of several micron meters (μm) to several tens of micron meters (μm).

Various forces are taken as follows:

Thrust force caused by differential pressure between the discharge side (pressure P2 at the discharge side) and the intake side (pressure P1 at the intake side) generated by an evacuation action of the pumping section: Fp Deadweight of the rotor: Fm Upward repulsive force generated by the gas bearing: Fδdu (δdu means an upper clearance of the gas bearing)

Downward repulsive force generated by the gas bearing: Fδdl (δdl means an lower clearance of the gas bearing)

Then, the equilibrium of forces is expressed in the following equation:

$$Fp+F\delta du=Fm+F\delta dl$$

If the thrust force Fp caused by the differential pressure is large (the thrust force FP is considerably larger than the deadweight Fm of the rotor), the downward repulsive force Fδdl must be larger than the upward repulsive force Fδdu in the gas bearing, and the difference between Fδdl and Fδdu must be large. In order to satisfy this condition, the clearance δdl of the gas bearing is required to be very small, and thus it is highly likely that contact occurs at the minute clearance of the gas bearing.

In contrast, if vacuum is produced in the interior of the pump, the differential pressure P2-P1 becomes small, and the produced thrust force Fp becomes small. Consequently, the clearance δdl of the gas bearing becomes large.

According to the present invention, a centrifugal blade element for compressing and evacuating gas in a radial direction is formed on at least one of a surface of the lower rotating part having an opposite surface which faces the spiral grooves and a surface of the stator blade which faces the lower rotating part in the axial direction. Therefore, gas can be compressed and evacuated from the discharge side to the intake side by the centrifugal blade element. Thus, vacuum is produced in the interior of the pump, and hence the thrust force Fp generated by the differential pressure P2-P1 can be reduced and the clearance δdl of the gas bearing can be maintained at a desired magnitude. Therefore, contact at the clearance portion of the gas bearing can be prevented, and the rotor can be stably rotated.

According to a fifth aspect of the present invention, there is provided a turbo vacuum pump comprising: a casing; a blade pumping section having rotor blades and stator blades which are disposed alternately in the casing; a main shaft for supporting the rotor blades; and a bearing and motor section having a motor for rotating the main shaft and a bearing mechanism for supporting the main shaft rotatably; wherein a gas bearing is used as a bearing for supporting the main shaft in a thrust direction, spiral grooves are formed in both surfaces of a rotating part of the gas bearing fixed to the main shaft, and the rotating part having the spiral grooves is placed between an upper stationary part and a lower stationary part; and wherein a centrifugal blade element for compressing and evacuating gas in a radial direction is formed on at least one of a surface of the rotor blade having an opposite surface which faces the lower stationary part in an axial direction and a surface of the stator blade which faces the rotor blade in an axial direction.

According to the fifth aspect of the present invention, because the gas bearing is used as a bearing for supporting the rotor including the main shaft and the rotor blades fixed to the main shaft in a thrust direction, the rotor can be rotatably supported in an axial direction of the rotor with an accuracy of several micron meters ($\mu$m) to several tens of micron meters ($\mu$m).

According to the present invention, because the centrifugal blade element is formed on at least one of a surface of the rotor blade having an opposite surface which faces the lower stationary part in an axial direction and a surface of the stator blade which faces the rotor blade in an axial direction, gas can be compressed and evacuated from the discharge side to the intake side by the centrifugal blade element. Thus, vacuum is produced in the interior of the pump, and hence the thrust force Fp generated by the differential pressure P2-P1 can be reduced and the clearance $\delta$dl of the gas bearing can be maintained at a desired magnitude. Therefore, contact at the clearance portion of the gas bearing can be prevented, and the rotor can be stably rotated.

In a preferred aspect of the present invention, at least a single stage centrifugal blade element for compressing and evacuating gas in a radial direction is provided on the rotor blade or the stator blade which is disposed at a location closer to the discharge side than a location where the centrifugal blade element is formed on the at least one of the lower rotating part and the stator blade.

According to the present invention, because plural stages of the centrifugal blade elements for compressing and evacuating gas in a radial direction are provided to develop vacuum in the interior of the pump, vacuum pressure in the pump can be further lowered. Thus, the thrust force Fp generated by the differential pressure P2-P1 can be further reduced. Accordingly, the clearance $\delta$dl of the gas bearing can be maintained at a desired magnitude, contact at the clearance portion of the gas bearing can be prevented, and the rotor can be stably rotated.

In a preferred aspect of the present invention, a bypass line for connecting the blade pumping section and an interior of the pump at a downstream side of the blade pumping section is provided.

According to the present invention, because the blade pumping section and the interior of the pump located at the downstream side of the blade pumping section are connected to each other, vacuum is produced in the interior of the pump at the downstream side of the blade pumping section. Thus, the thrust force Fp generated by the differential pressure P2-P1 between the discharge side (pressure P2 at the discharge side) and the intake side (pressure P1 at the intake side) can be reduced and the clearance $\delta$dl of the gas bearing can be maintained at a desired magnitude. Therefore, contact at the clearance portion of the gas bearing can be prevented, and the rotor can be stably rotated.

In a preferred aspect of the present invention, an opening degree adjustment mechanism is provided in the bypass line.

According to the present invention, because it is possible to control the vacuum pressure P2 in the interior of the pump by the opening degree adjustment mechanism provided in the bypass line, the thrust force Fp can be controlled, and the axial position of the rotor can be controlled.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
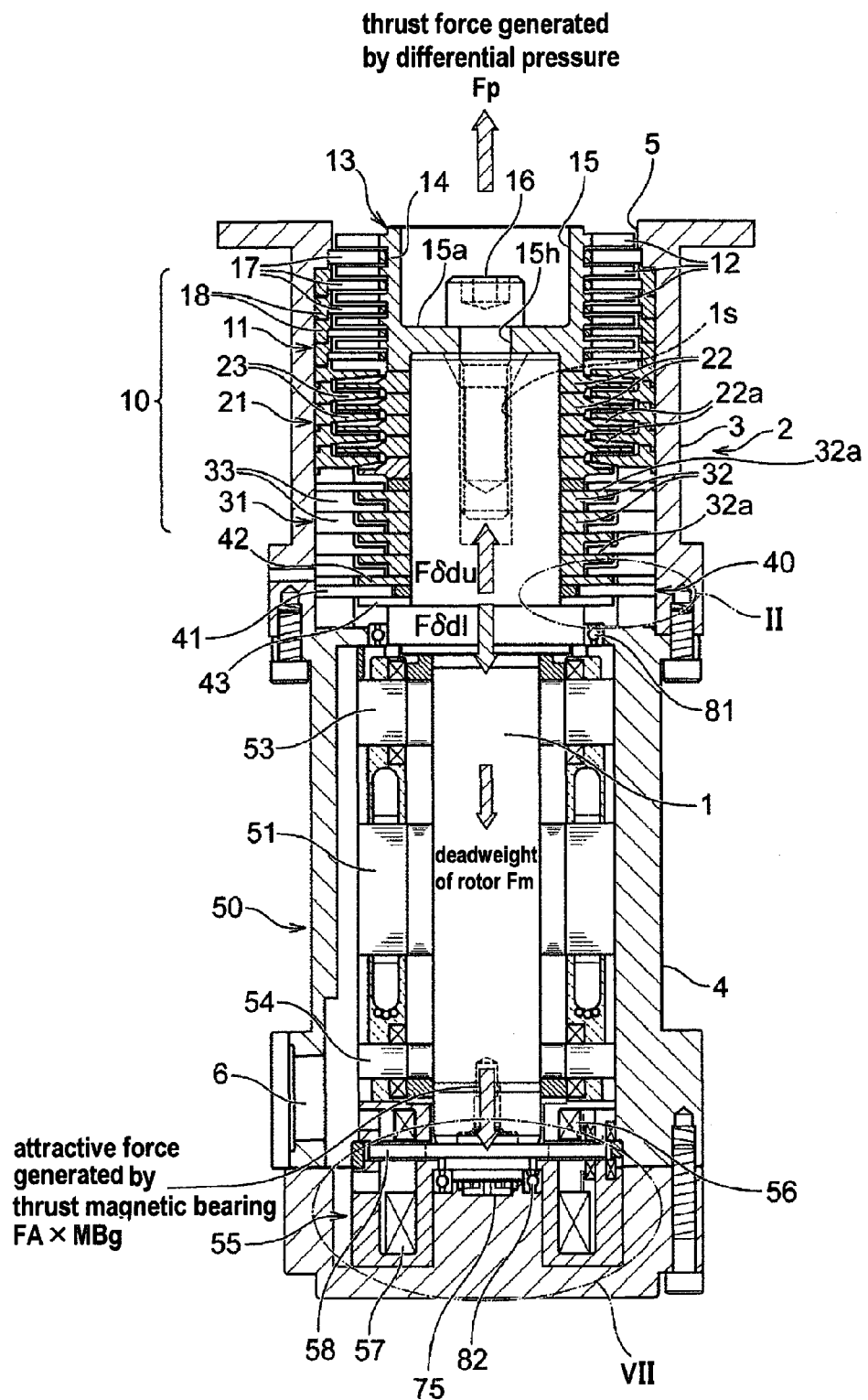
FIG. 1 is a cross-sectional view showing a turbo vacuum pump according to a first embodiment of the present invention.

A turbo vacuum pump according to a first embodiment of the present invention will be described below with reference to FIGS. 1 through 11. Like or corresponding parts are denoted by like or corresponding reference numerals throughout drawings and will not be described below repetitively. and will not be described below repetitively.

FIG. 1 is a cross-sectional view showing a turbo vacuum pump according to the first embodiment of the present invention. As shown in FIG. 1, the turbo vacuum pump comprises a main shaft (rotating shaft) 1 extending over the substantially entire length of the pump, a pumping section 10 in which rotor blades and stator blades are alternately disposed in a casing 2, and a bearing and motor section 50 having a motor for rotating the main shaft 1 and bearings for rotatably supporting the main shaft 1. The casing 2 comprises an upper casing 3 for housing the pumping section 10 and a lower casing 4 for housing the bearing and motor section 50, and an intake port 5 is formed at the upper end portion of the upper casing 3 and a discharge port 6 is formed at the lower part of the lower casing 4.

The pumping section 10 comprises a turbine blade pumping section 11, a first centrifugal blade pumping section 21 and a second centrifugal blade pumping section 31 which are arranged in series from the intake port side to the lower part of the upper casing 3. The turbine blade pumping section 11 comprises multistage turbine blades 12 as multistage rotor blades, and multistage stator blades 17 which are disposed at immediately downstream side of the multistage turbine blades 12. The multistage turbine blades 12 are integrally formed on a substantially cylindrical turbine blade unit 13, and a hollow part 15 is formed in a boss part 14 of the turbine blade unit 13. A through hole 15h is formed in a bottom 15a of the hollow part 15, so that a bolt 16 is inserted into the through hole 15h. Specifically, the bolt 16 passes through the through hole 15h and is screwed into a threaded hole 1s of the upper part of the main shaft 1. Thus, the turbine blade unit 13 is fixed to the main shaft 1.

On the other hand, the multistage stator blades 17 are held between spacers 18 stacked in the upper casing 3 and are fixed in the upper casing 3. In this manner, the multistage turbine blades 12 as rotor blades and the multistage stator blades 17 are alternately disposed in the turbine blade pumping section 11.

The first centrifugal blade pumping section 21 comprises centrifugal blades 22 as multistage rotor blades, and multistage stator blades 23 which are disposed at immediately downstream side of the centrifugal blades 22. The centrifugal blades 22 are stacked in a multistage manner and fitted over the outer periphery of the main shaft 1. The centrifugal blades 22 may be fixed to the main shaft 1 by a fixing member such as a key. Further, the stator blades 23 are stacked in a multistage manner in the upper casing 3. In this manner, the centrifugal blades 22 as rotor blades and the stator blades 23 are alternately disposed in the first centrifugal blade pumping section 21. Each of the centrifugal blades 22 has a centrifugal blade element 22a comprising centrifugal blade grooves for compressing and evacuating gas in a radial direction.

The second centrifugal blade pumping section 31 comprises centrifugal blades 32 as multistage rotor blades, and multistage stator blades 33 which are disposed at immediately downstream side of the centrifugal blades 32. The centrifugal blades 32 are stacked in a multistage manner and fitted over the outer periphery of the main shaft. The centrifugal blades 32 may be fixed to the main shaft 1 by a fixing member such as a key. Further, the stator blades 33 are stacked in a multistage manner in the upper casing 3. In this manner, the centrifugal blades 32 as rotor blades and the stator blades 33 are alternately disposed in the second centrifugal blade pumping section 31. Each of the centrifugal blades 32 has a centrifugal blade element 32a comprising centrifugal blade grooves for compressing and evacuating gas in a radial direction. A gas bearing 40 is provided at immediately downstream side of the second centrifugal blade pumping section 31 to support the rotor including the main shaft 1 and the rotor blades 12, 22, 32 fixed to the main shaft 1.

Figure 2:
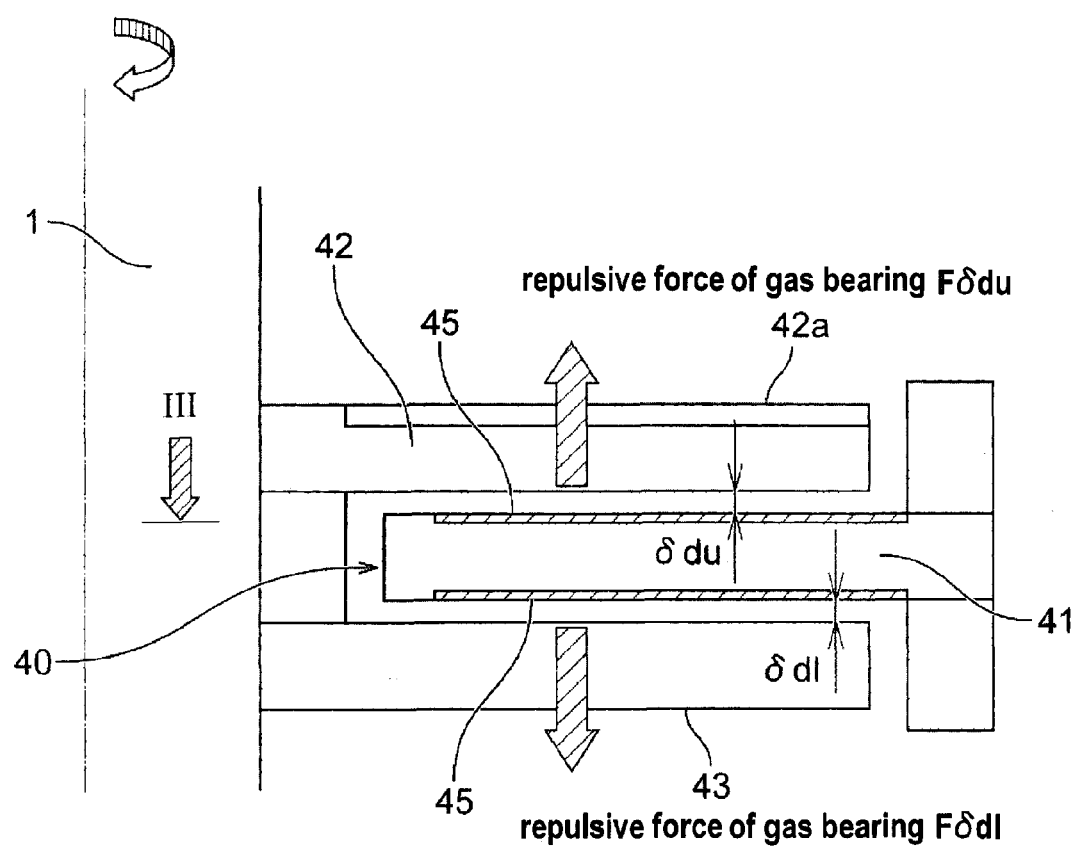
FIG. 2 is a view showing II part of FIG. 1, and an enlarged view showing a gas bearing and peripheral part of the gas bearing.

FIG. 2 is a view showing II part of FIG. 1, and an enlarged view showing the gas bearing 40 and peripheral part of the gas bearing 40. As shown in FIG. 2, the gas bearing 40 comprises a stationary member (stationary part) 41 fixed to the upper casing 3, and an upper rotating member (upper rotating part) 42 and a lower rotating member (lower rotating part) 43 which are disposed above and below the stationary member (stationary part) 41 so as to place the stationary member (stationary part) 41 between the upper rotating member (upper rotating part) 42 and the lower rotating member (lower rotating part) 43. The upper rotating member (upper rotating part) 42 and the lower rotating member (lower rotating part) 43 are fixed to the main shaft 1. Spiral grooves 45, 45 are formed in both surfaces of the stationary member (stationary part) 41.

Specifically, the stationary member (stationary part) 41 having the spiral grooves 45, 45 is placed between the upper and lower divided members (parts), i.e. the upper rotating member (upper rotating part) 42 and the lower rotating member (lower rotating part) 43. A centrifugal blade element 42a for compressing and evacuating gas in a radial direction is formed on a surface of the upper rotating member (upper rotating part) 42 having an opposite surface which faces the spiral grooves 45 of the stationary member (stationary part) 41. The centrifugal blade element 42a comprises centrifugal blade grooves for compressing and evacuating gas in a radial direction.

Figure 3:
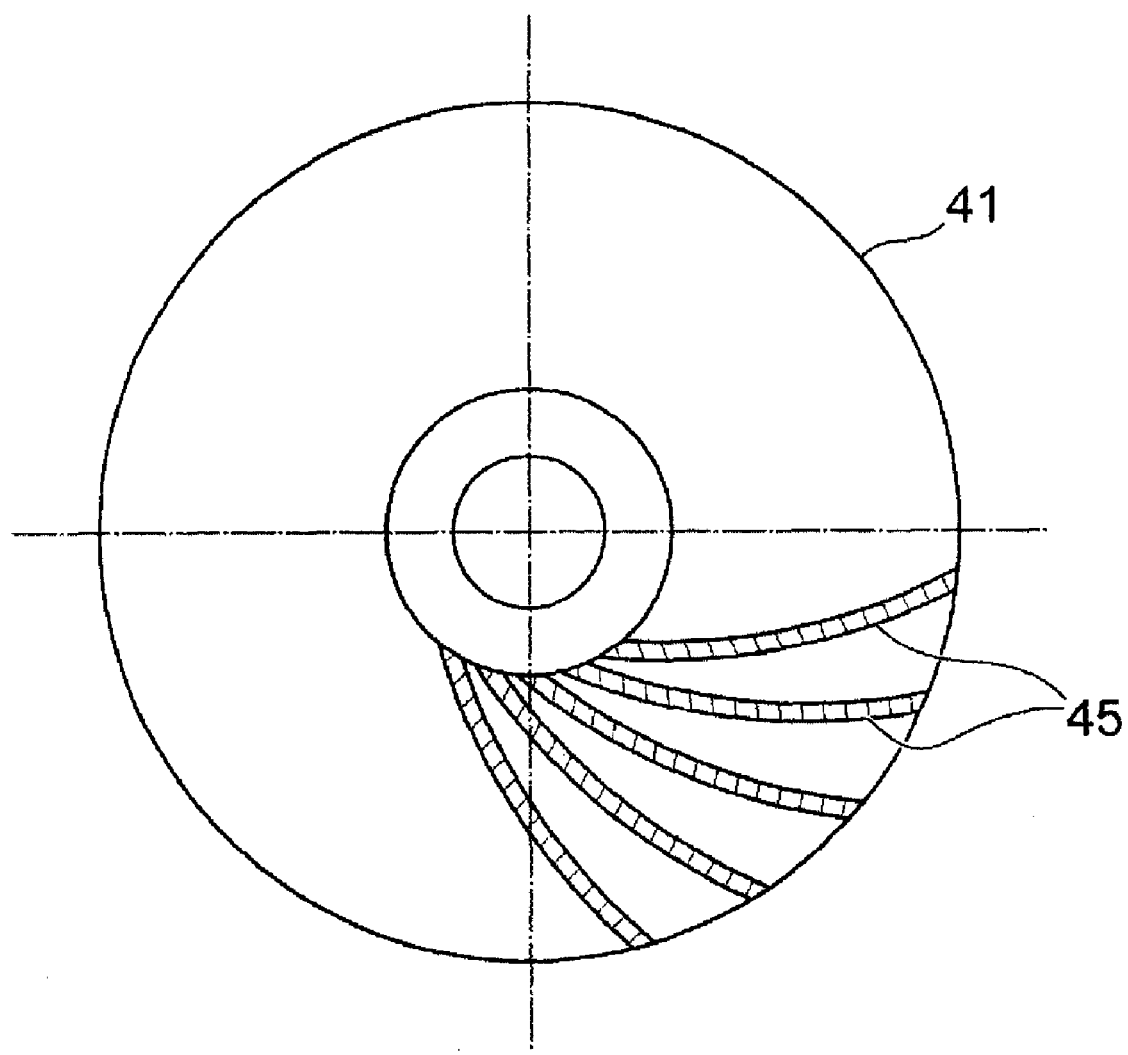
FIG. 3 is a view as viewed from an arrow III of FIG. 2.

FIG. 3 is a view as viewed from an arrow III of FIG. 2. As shown in FIG. 3, a number of spiral grooves 45 are formed in the surface of the stationary member (stationary part) 41 over the substantially entire surface of the stationary member (stationary part) 41 (in FIG. 3, part of spiral grooves are shown).

As shown in FIG. 2, because the gas bearing 40 is used as a bearing for supporting the rotor including the main shaft 1 and the rotor blades fixed to the main shaft 1 in a thrust direction, the rotor can be rotatably supported in an axial direction of the rotor with an accuracy of several micron meters (μm) to several tens of micron meters (μm). The centrifugal blade element 42a for compressing gas in a radial direction is integrally formed on the rotor part constituting a part of the gas bearing 40, i.e. the upper rotating member (upper rotating part) 42. Because the minute clearance of the gas bearing 40 and the minute clearance of the centrifugal blades are in the same thrust direction, the blade clearance of the centrifugal blade element 42a can be set to be substantially equal to the clearance of the gas bearing 40 or to be slightly larger than the clearance of the gas bearing 40. Specifically, because the centrifugal blade element 42a for compressing gas in the radial direction is formed on the upper rotating member (upper rotating part) 42, the upper rotating member (upper rotating part) 42 constitutes a centrifugal blade as well as a part of the gas bearing 40 for axial positioning of the rotor. In this manner, since the centrifugal blade element 42a for compressing gas in the radial direction is formed on the upper rotating member (upper rotating part) 42 for axial positioning of the rotor, the blade clearance of the centrifugal blade element 42a can be controlled with high accuracy.

Next, the bearing and motor section 50 will be described in detail. As shown in FIG. 1, the bearing and motor section 50 comprises a motor 51 for rotating the main shaft 1, an upper radial magnetic bearing 53 and a lower radial magnetic bearing 54 for rotatably supporting the main shaft 1 in a radial direction, and a thrust magnetic bearing 55 for canceling out a thrust force generated by the differential pressure between the discharge side and the intake side by an evacuation action of the pumping section 10. The motor 51 comprises a high-frequency motor. The upper radial magnetic bearing 53, the lower radial magnetic bearing 54 and the thrust magnetic bearing 55 comprise an active magnetic bearing. In order to prevent the rotor blade and the stator blade from being brought into contact with each other when an abnormality occurs in one of the magnetic bearings 53, 54, 55, an upper touchdown bearing 81 and a lower touchdown bearing 82 are provided to support the main shaft 1 in a radial direction and an axial direction.

The thrust magnetic bearing 55 comprises an upper thrust magnetic bearing 56 having electromagnet, a lower thrust magnetic bearing 57 having electromagnet, and a target disk 58 fixed to the lower part of the main shaft 1. In the thrust magnetic bearing 55, the target disk 58 is held between the upper thrust magnetic bearing 56 and the lower thrust magnetic bearing 57, and the target disk 58 is attracted by the electromagnets of the upper and lower thrust magnetic bearings 56, 57 to cancel out a thrust force generated by the differential pressure between the discharge side and the intake side by an evacuation action of the pumping section 10.

FIG. 1 shows equilibrium of force in the case where the vacuum pump is vertically installed. As shown in FIG. 1, various forces are taken as follows:

Thrust force caused by differential pressure between the discharge side and the intake side generated by an evacuation action of the pumping section: Fp Deadweight of the rotor: Fm Attractive force generated by the thrust magnetic bearing 55: FAxMBg Upward repulsive force generated by the gas bearing 40: Fδdu Downward repulsive force generated by the gas bearing 40: Fδdl Then, the equilibrium of forces is expressed in the following equation:

$$Fp + F\delta du = Fm + FAxMBg + F\delta dl$$

If Fp is equivalent to (Fm+FAxMBg), the upper clearance (δdu) is equal to the lower clearance (δdl) in the gas bearing 40. Specifically, if the attractive force (FAxMBg) generated by the thrust magnetic bearing 55 is controlled so as to be equal to the value obtained by subtracting the deadweight (Fm) of the rotor from the thrust force (Fp) caused by the differential pressure between the discharge side and the intake side generated by the evacuation action of the pumping section, then the upper clearance and the lower clearance in the gas bearing 40 can be equal to each other (δdu=δdl).

Figure 4:
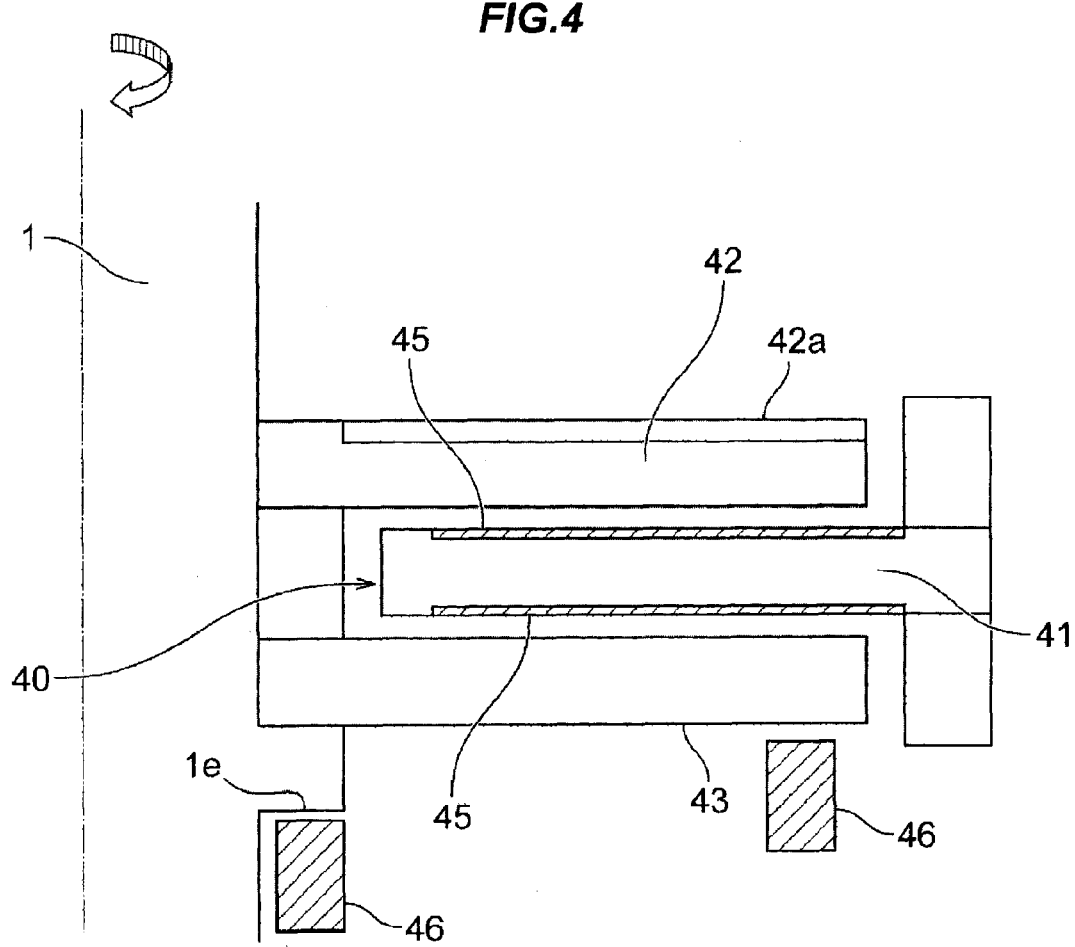
FIG. 4 is an enlarged view showing an example in which a displacement sensor for detecting an axial displacement of a rotor including a main shaft and rotor blades fixed to the main shaft is provided.

FIG. 4 is an enlarged view showing an example in which a displacement sensor for detecting an axial displacement of the rotor including the main shaft 1 and the rotor blades fixed to the main shaft 1 is provided. As shown in FIG. 4, a displacement sensor 46 is disposed immediately below the lower rotating member (lower rotating part) 43 of the gas bearing 40. The displacement sensor 46 can measure the displacement of the rotor by measuring the distance between the displacement sensor 46 and the lower surface of the lower rotating member (lower rotating part) 43. The displacement sensor 46 comprises a noncontact sensor such as an eddy current sensor, an inductive sensor, an ultrasonic sensor, an LED sensor, or the like. Further, as shown in the left part of FIG. 4, the displacement sensor 46 may be provided at the location for detecting an end face 1e of the main shaft 1.

According to the present embodiment, because the gas bearing 40 is used as a bearing for supporting the rotor in a thrust direction, the rotor can be rotatably supported in an axial direction of the rotor with an accuracy of several micron meters (μm) to several tens of micron meters (μm). If the rotor is axially displaced due to a thrust force generated by differential pressure caused by a compression action of the pump and cannot be stably rotated due to the contact in the minute clearance portion of the gas bearing 40, such displacement of the rotor is detected by a displacement sensor 46 provided in the vicinity of the gas bearing 40. Then, the thrust magnetic bearing 55 for canceling out the thrust force generated by the differential pressure attracts the rotor, thereby rotating the rotor stably.

Further, in the case where the repulsive force of the permanent magnet is utilized for canceling out the thrust load as disclosed in Japanese laid-open patent publication No. 6-193586, as clearance between the permanent magnet and an object facing the permanent magnet is narrower, the repulsive force of the permanent magnet becomes stronger. However, such repulsive force (i.e. clearance) cannot be controlled, and thus the thrust position of the rotor cannot be controlled. Therefore, the rotor is rotated at the position where the repulsive force of the gas bearing, the thrust force caused by the differential pressure, the repulsive force of the permanent magnet, and the deadweight of the rotor balance. In the method in which the permanent magnet is used, the blade clearance is affected by an accuracy of each component for generating the thrust force, and variation in evacuation performance tends to occur.

According to the present invention, the thrust magnetic bearing 55 for canceling out the thrust force caused by the differential pressure is provided, and thus at least one element which is capable of being controlled is added to the construction for generating the thrust force. Accordingly, the position of the rotor in the thrust direction can be controlled with high accuracy, and performance of the pump can be stabilized.

Figure 5A:
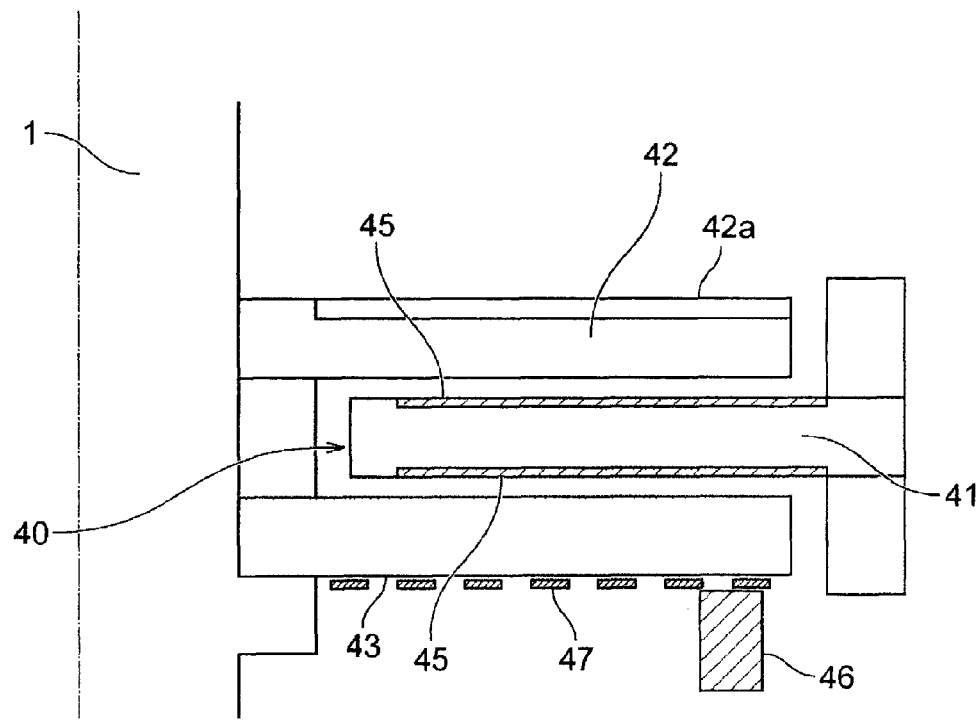
FIG. 5A is a view showing an example in which surface treatment composed of a conductive material is applied to a lower rotating member (lower rotating part) of the gas bearing.
Figure 5B:
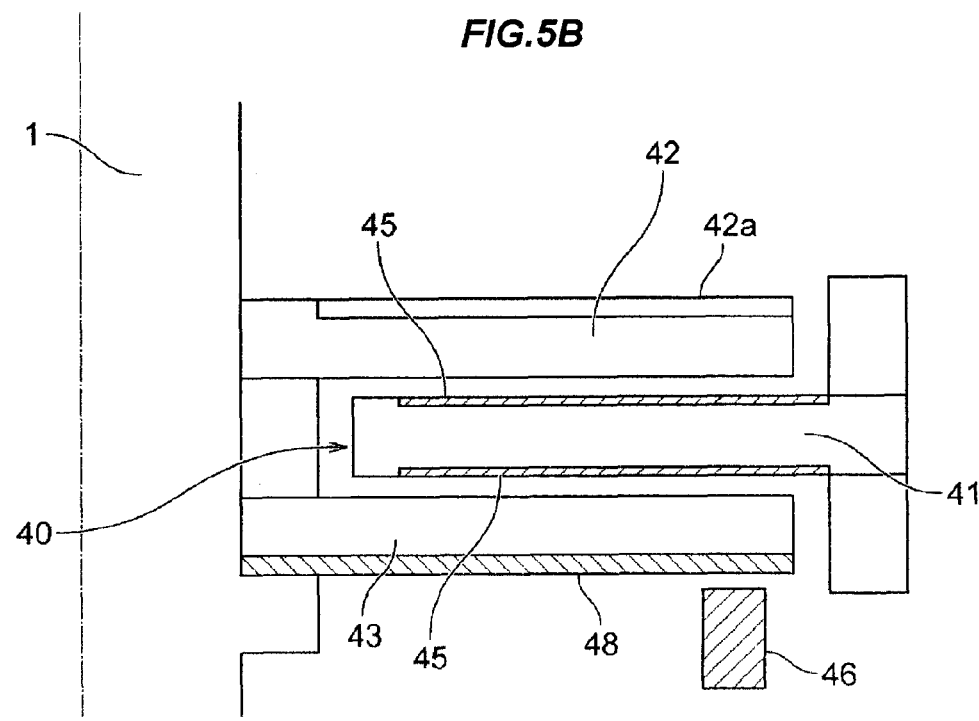
FIG. 5B is a view showing an example in which a thin plate composed of a conductive material or a magnetic material is provided between the lower rotating member (lower rotating part) of the gas bearing and the rotor.

As an input for controlling the thrust force of the thrust magnetic bearing 55, axial displacement signals of the rotor from the displacement sensor 46 provided in the vicinity of the gas bearing 40 are used. In the case where the target of the displacement sensor 46 is the lower rotating member (lower rotating part) 43, and a material of the lower rotating member (lower rotating part) 43 is ceramics, if the displacement sensor 46 comprises an eddy current sensor or an inductive sensor, then the displacement sensor 46 cannot detect the target. If the displacement sensor 46 comprises an eddy current sensor, as shown in FIG. 5A, surface treatment 47 such as plating or CVD (chemical vapor deposition) composed of a conductive material should be applied to the target surface of the lower rotating member (lower rotating part) 43. The conductive material may comprise copper or the like. Further, if the displacement sensor 46 comprises an inductive sensor, the surface treatment 47 composed of a magnetic material may be applied to the target surface. The magnetic material may comprise nickel or the like. Further, as shown in FIG. 5B, a thin plate 48 composed of a conductive material or a magnetic material may be provided on the target surface of the lower rotating member (lower rotating part) 43 of the gas bearing 40.

As shown in the left part of FIG. 4, in the case where the displacement sensor 46 is provided at the location for detecting the end face 1e of the main shaft 1, if the main shaft 1 is composed of a material having electrical conductivity or magnetic property such as martensitic stainless steel, the main shaft itself can be the target of the displacement sensor without requiring the above surface treatment. The same surface treatment may be applied to the main shaft depending on a material of the main shaft.

Figure 6:
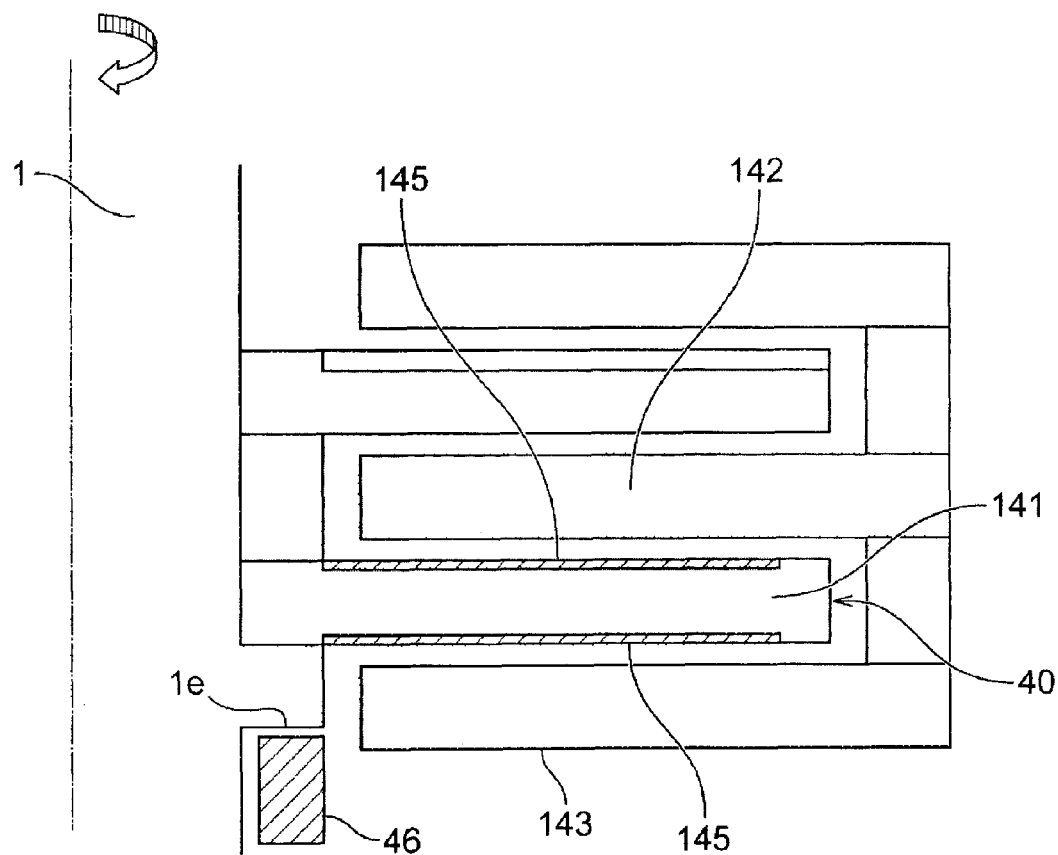
FIG. 6 is an enlarged view showing a gas bearing and peripheral part of the gas bearing according to another embodiment.

FIG. 6 is an enlarged view showing the gas bearing 40 and peripheral part of the gas bearing 40 according to another embodiment. As shown in FIG. 6, the gas bearing 40 comprises a rotating member (rotating part) 141 fixed to the main shaft 1, and an upper stationary member (upper stationary part) 142 and a lower stationary member (lower stationary part) 143 which are disposed above and below the rotating member (rotating part) 141 so as to place the rotating member (rotating part) 141 between the upper stationary member (upper stationary part) 142 and the lower stationary member (lower stationary part) 143. The upper stationary member (upper stationary part) 142 and the lower stationary member (lower stationary part) 143 are fixed to the upper casing 3. Spiral grooves 145, 145 are formed in both surfaces of the rotating member (rotating part) 141.

Specifically, the rotating member (rotating part) 141 having the spiral grooves 145, 145 is placed between the upper and lower divided members (parts), i.e. the upper stationary member (upper stationary part) 142 and the lower stationary member (lower stationary part) 143. As shown in FIG. 6, a displacement sensor 46 for detecting an axial displacement of the rotor is disposed immediately below the end face 1e of the main shaft 1.

According to the present embodiment, because the gas bearing 40 is used as a bearing for supporting the rotor in a thrust direction, the rotor can be rotatably supported in an axial direction of the rotor with an accuracy of several micron meters (μm) to several tens of micron meters (μm) If the rotor is axially displaced due to a thrust force caused by differential pressure generated by a compression action of the pump and cannot be stably rotated due to the contact in the minute clearance portion of the gas bearing 40, such displacement of the rotor is detected by a displacement sensor 46 provided in the vicinity of the gas bearing 40. Then, the thrust magnetic bearing 55 for canceling out the thrust force generated by the differential pressure attracts the rotor, thereby rotating the rotor stably.

Figure 7:
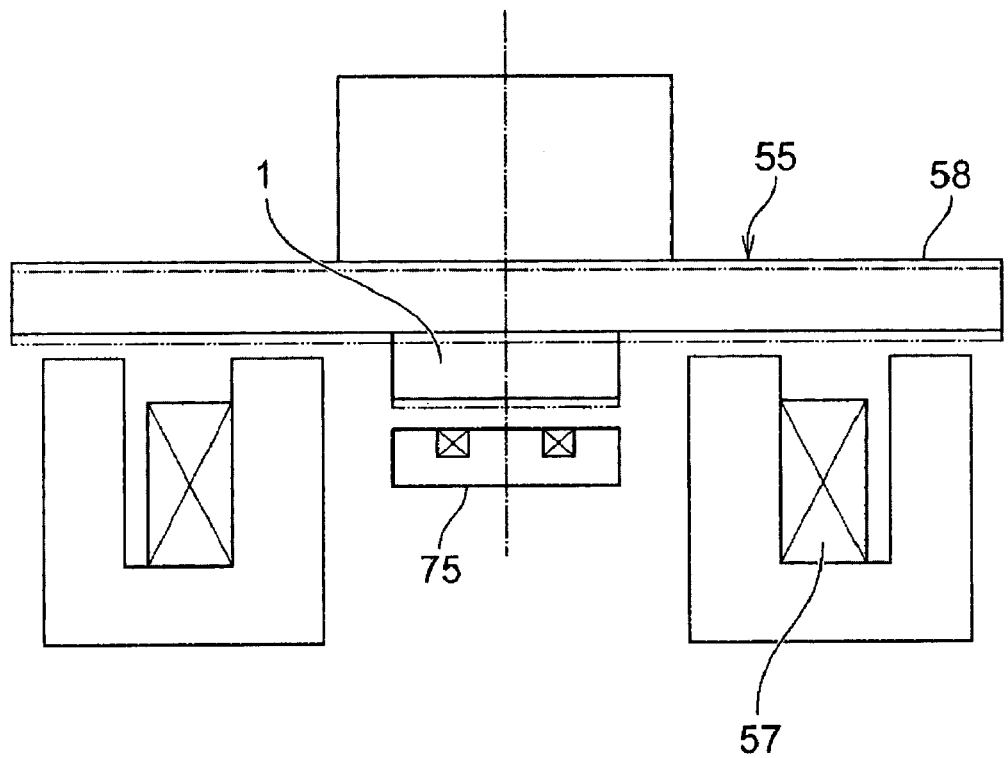
FIG. 7 is a view showing VII part of FIG. 1, and an enlarged view showing a thrust magnetic bearing and peripheral part of the thrust magnetic bearing.

FIG. 7 is a view showing VII part of FIG. 1, and an enlarged view showing the thrust magnetic bearing 55 and peripheral part of the thrust magnetic bearing 55. In the turbo vacuum pump according to the present embodiment, as shown in FIG. 7, a displacement sensor 75 for detecting the axial displacement of the main shaft 1 is provided in the vicinity of the thrust magnetic bearing 55.

As the thrust magnetic bearing 55 is closer to the object to be attracted (magnetic clearance is smaller), the magnetic attractive force becomes larger. When the vacuum pump is rotated at high speed, the main shaft extends in a thrust direction by heat generation at the high-frequency motor part. In FIG. 7, the state in which the main shaft 1 extends in the thrust direction is shown by dotted lines. Therefore, even if the same controlled variable is inputted into the thrust magnetic bearing 55, the produced thrust forces differ depending on the magnetic clearance of the thrust magnetic bearing 55. Therefore, as shown in FIG. 7, the displacement sensor 75 for measuring displacement (thermal deformation quantity) of the main shaft 1 in the thrust direction is provided in the vicinity of the thrust magnetic bearing 55. Accordingly, the produced thrust load is corrected based on changed portion of the magnetic clearance caused by deformation of the main shaft 1, thereby suppressing the generation of excessive thrust force. As a method for detecting displacement of the main shaft in the thrust direction, besides the method of using the displacement sensor, the temperature of the motor or the radial magnetic bearing is measured to calculate thermal deformation quantity of the main shaft in the thrust direction.

Figure 8:
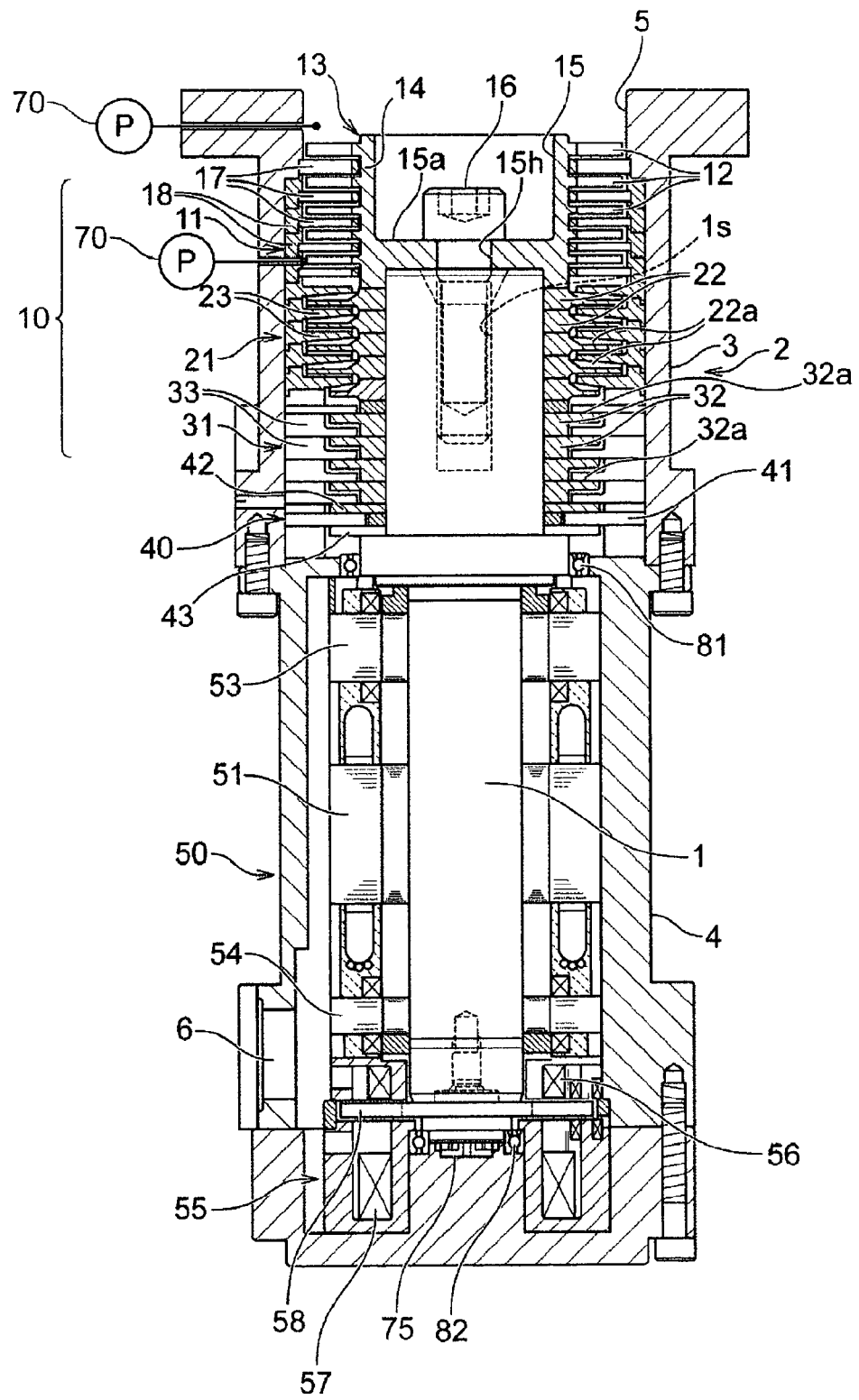
FIG. 8 is a vertical-cross sectional view showing a modified example of the first embodiment of the turbo vacuum pump according to the present invention.

FIG. 8 is a vertical-cross sectional view showing a modified example of the first embodiment of the turbo vacuum pump according to the present invention. In the turbo vacuum pump shown in FIG. 8, in place of the displacement sensor 46 provided in the turbo vacuum pump shown in FIGS. 1 through 6, a vacuum gauge for measuring vacuum pressure in the pumping section is provided. Specifically, a vacuum gauge 70 for measuring vacuum pressure of the intake port 5 of the upper casing 3 is fixed to the upper casing 3. The vacuum gauge 70 comprises a diaphragm gauge (Baratron gauge), an ionization gauge, a Pirani gauge, or the like. As shown in FIG. 8, the vacuum gauge 70 may be provided at the intermediate part of the upper casing 3 to measure vacuum pressure of the turbine blade pumping section 11 having the turbine blades 12. The other structure of the turbo vacuum pump shown in FIG. 8, i.e. the structure of the gas bearing 40, the bearing and motor section 50 having the thrust magnetic bearing 55, the displacement sensor 75, and the like is the same as the structure of the turbo vacuum pump shown in FIGS. 1 through 7.

In the turbo vacuum pump shown in FIG. 8, as an input for controlling the thrust force of the thrust magnetic bearing 55, differential pressure signals from the vacuum gauge 70 for measuring vacuum pressure of the intake port 5 or the interior of the pump are used. Specifically, the differential pressure between the discharge side and the intake side generated by the evacuation action of the pumping section is inputted into the control section of the thrust magnetic bearing 55, and the thrust force corresponding to the differential pressure is generated by the thrust magnetic bearing 55. The vacuum gauge 70 is disposed at the intake port 5 so as to measure the differential pressure itself. However, if the vacuum gauge cannot be provided at the intake port or in the vicinity of the intake port, then the vacuum gauge may be provided at the intermediate part of the pumping section. For example, in the case where the pressure of the intake port of the pump is $1 \times 10^{-5}$ Torr, and the back pressure of the pump is atmospheric pressure, the differential pressure is $760-1 \times 10^{-5} \sim 760$ Torr. Even if the vacuum gauge is provided at the location where vacuum pressure is several Torr level (for example, 10 Torr) in the intermediate part of the pumping section, the differential pressure is 760−10=750 Torr. Therefore, the error as an input of the attractive force is about 1.3%, and thus this error has little effect on the positional control of the rotor.

Figure 14:
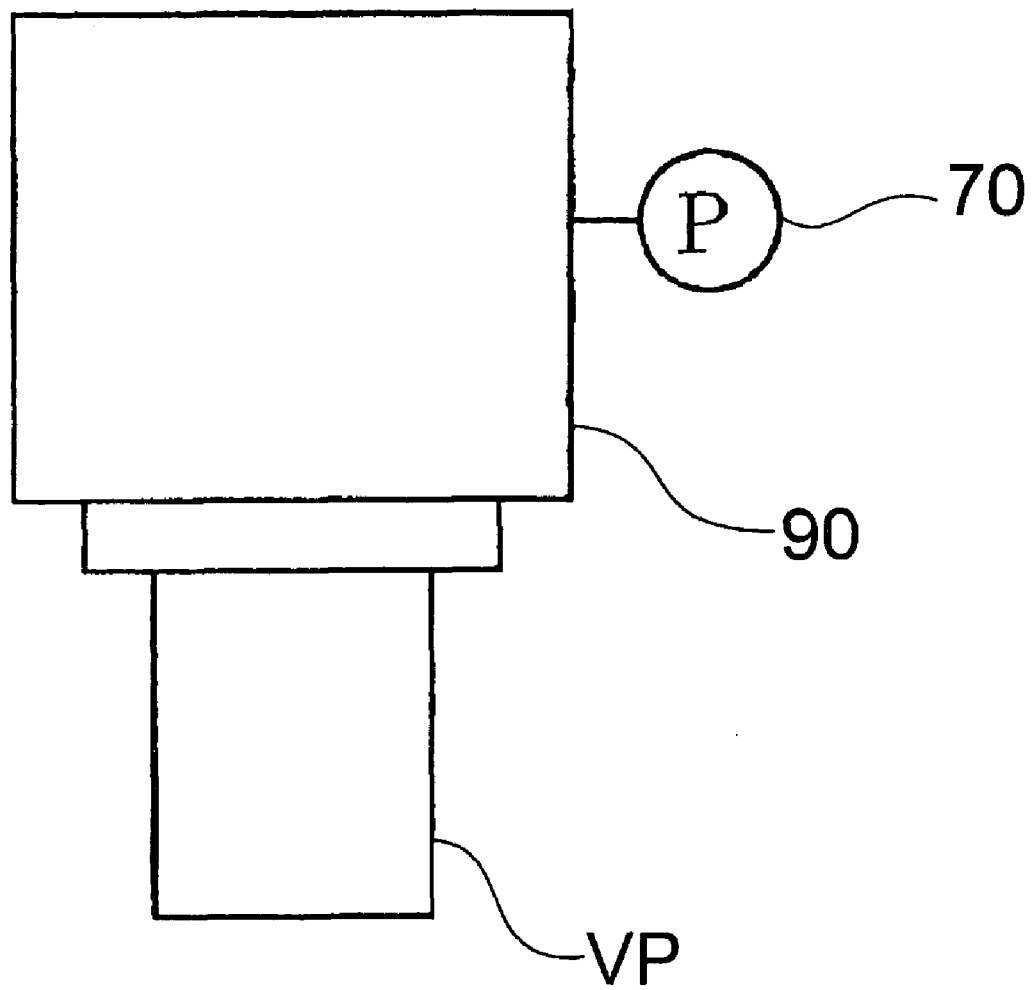
FIG. 14 is a schematic view showing an example in which a vacuum gauge is provided on a vacuum chamber.

FIG. 14 is a schematic view showing an example in which a vacuum gauge is provided on a vacuum chamber. As shown in FIG. 14, in the case where a vacuum gauge 70 is provided on a vacuum chamber 90 located at the intake side of the turbo vacuum pump, measurement values of the vacuum gauge 70 are inputted into the control section of the thrust magnetic bearing 55 of the turbo vacuum pump VP. In this case, it is not necessary to provide the vacuum gauge on the vacuum pump.

Besides the method in which the differential pressure between the discharge side and the intake side generated by the evacuation action of the pumping section is measured by the vacuum gauge, the pump performance corresponding to rotational speed of the pump may be obtained in advance, and the differential pressure may be calculated from the pump intake pressure according to the rotational speed of the vacuum pump.

If the attractive force by the thrust magnetic bearing is completely equal to the thrust force by the differential pressure, there is a possibility that the blade clearance is changed by minute pulsation of the thrust force caused by the differential pressure or minute pulsation of the attractive force generated by the thrust magnetic bearing. As shown in FIGS. 1 and 8, in the case where the vacuum pump is vertically installed, as described above, various forces are taken as follows:

Thrust force caused by differential pressure between the discharge side and the intake side generated by an evacuation action of the pumping section: Fp Deadweight of the rotor: Fm Attractive force generated by the thrust magnetic bearing 55: FAxMBg Then, when these forces have the relation of Fp=Fm+FAxMBg, the repulsive forces Fδdu and Fδdl of the upper and lower surfaces of the gas bearing 40 balance. Thus, the upper clearance and the lower clearance of the gas bearing 40 can be equal to each other (δdu=δdl).

The repulsive force of the gas bearing is affected by the clearance. As clearance is narrower, the repulsive force becomes stronger. In the above-mentioned state, the rotor is positioned at the center of the clearance of the gas bearing, and thus fluctuation of the rotor up and down is most likely to occur. Accordingly, the axial position of the rotor is changed by minute pulsation or the like, and variation in pump performance is likely to occur. Therefore, the thrust force caused by the differential pressure should be larger than the attractive force generated by the thrust magnetic bearing, and vice versa, and then minute pulsation may be negligible.

Next, the blade elements of the pumping section 10 in the turbo vacuum pump shown in FIGS. 1 through 8 will be described in detail.

Figure 9A:
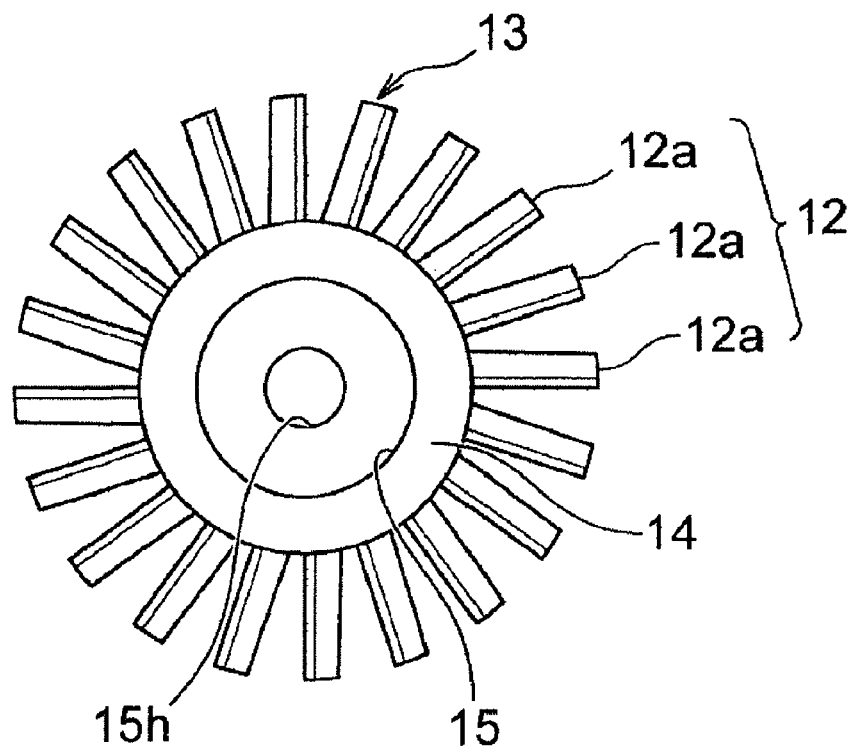
FIG. 9A is a plan view showing a turbine blade unit of a turbine blade pumping section, as viewed from the intake port side, and showing only an uppermost stage turbine blade closest to an intake port of a casing.
Figure 9B:
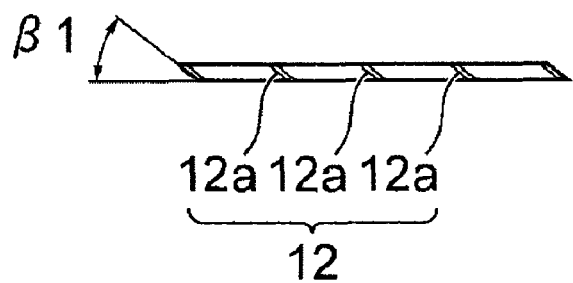
FIG. 9B is a plan view, partially developed on a plane, of the turbine blade, as viewed radially toward the center thereof.

FIGS. 9A and 9B are views showing the configuration of the turbine blade unit 13 of the turbine blade pumping section 11. FIG. 9A is a plan view showing the turbine blade unit 13, as viewed from the intake port side, and showing only the uppermost stage turbine blade 12 closest to the intake port 5 of the casing 2. FIG. 9B is a plan view, partially developed on a plane, of the turbine blade 12, as viewed radially toward the center thereof. As shown in FIGS. 9A and 9B, the turbine blade unit 13 has a boss part 14 and turbine blades 12. Each of the turbine blades 12 has a plurality of plate-like vanes 12a radially extending from the outer periphery of the boss part 14. The boss part 14 has a hollow part 15 and a through hole 15h. Each vane 12a is attached with a twist angle of β1 (10° to 40°, for example) with respect to the central axis of the main shaft 1.

The other turbine blades 12 have the same configuration as the uppermost stage turbine blade 12. The number of the vanes 12a, the twist angle β1 of the vanes 12a, the outer diameter of the portion of the boss part 14 to which the vanes 12a are attached, and the length of the vanes 12a may be changed as needed.

Figure 10A:
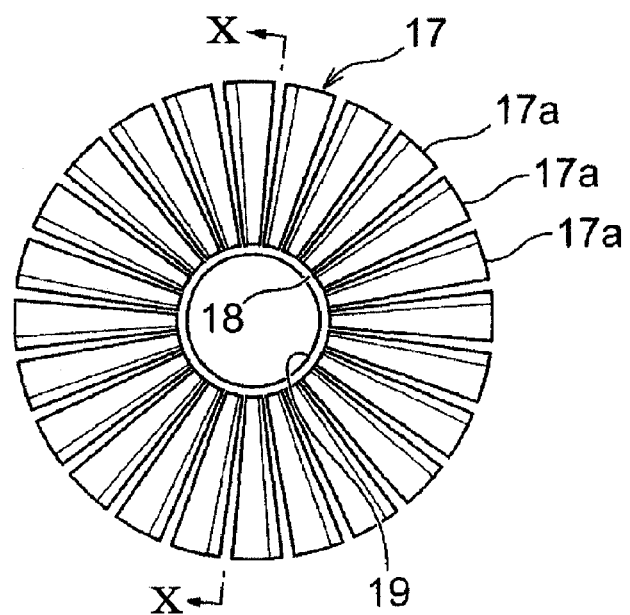
FIG. 10A is a plan view of an uppermost stage stator blade closest to the intake port of the casing, as viewed from the intake port side.
Figure 10B:
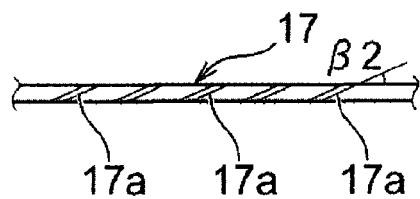
FIG. 10B is a plan view, partially developed on a plane, of the stator blade, as viewed radially toward the center thereof.
Figure 10C:
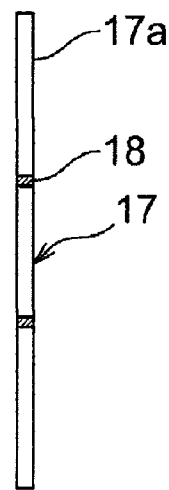
FIG. 10C is a cross-sectional view taken along the line X-X of FIG. 10A.

FIGS. 10A, 10B and 10C are views showing the configuration of the stator blade 17 of the turbine blade pumping section. FIG. 10A is a plan view of the uppermost stage stator blade 17 closest to the intake port 5 of the casing 2, as viewed from the intake port side. FIG. 10B is a plan view, partially developed on a plane, of the stator blade 17, as viewed radially toward the center thereof. FIG. 10C is a cross-sectional view taken along the line X-X of FIG. 10A. The stator blade 17 has a ring-shaped portion 18 with an annular shape, and plate-like vanes 17a radially extending from the outer periphery of the ring-shaped portion 18. The inner periphery of the ring-shaped portion 18 defines a shaft hole 19, and the main shaft 1 (shown in FIG. 1) passes through the shaft hole 19. Each vane 17a is attached with a twist angle of β2 (10° to 40°, for example) with respect to the central axis of the main shaft 1. The other stator blades 17 have the same configuration as the uppermost stage stator blade 17. The number of the vanes 17a, the twist angle β2 of the vanes 17a, the outer diameter of the ring-shaped portion 18 and the length of the vanes 17a may be changed as needed.

Figure 11A:
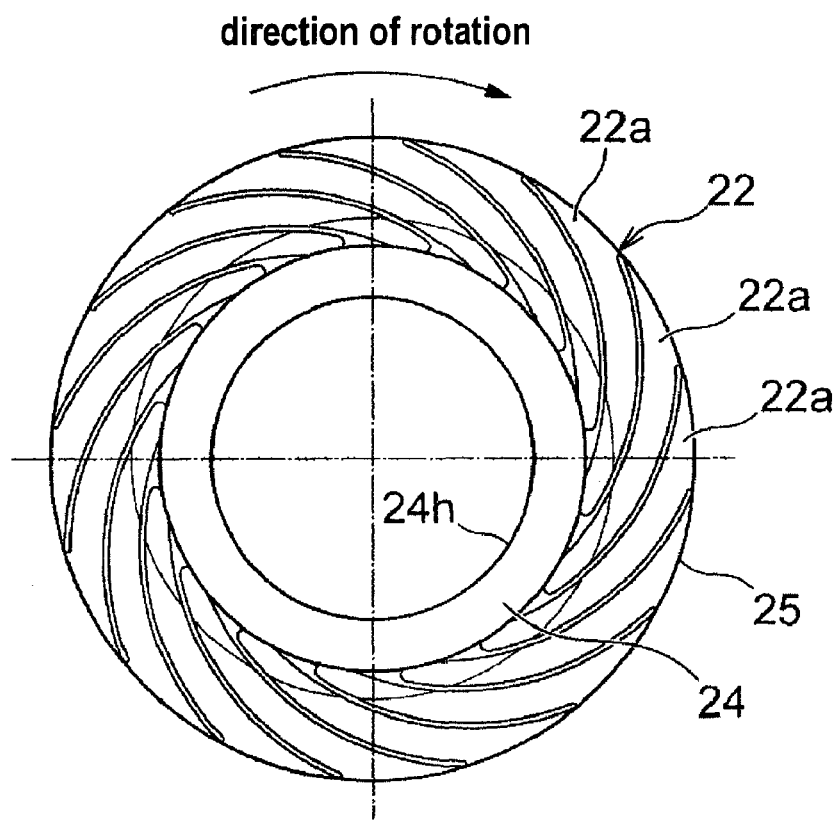
FIG. 11A is a plan view showing a centrifugal blade of a first centrifugal blade pumping section, and showing the uppermost stage turbine blade closest to the intake port of the casing.
Figure 11B:
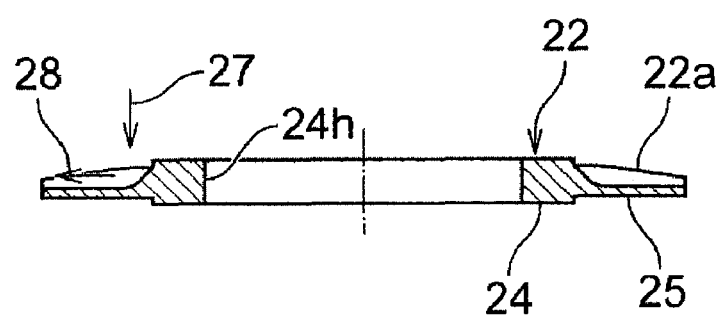
FIG. 11B is a front cross-sectional view showing the centrifugal blade of the first centrifugal blade pumping section.

FIGS. 11A and 11B are views showing the configuration of the centrifugal blade 22 of the first centrifugal blade pumping section 21. FIG. 11A is a plan view of the uppermost stage centrifugal blade 22 closest to the intake port 5 of the casing 2, and FIG. 11B is a front cross-sectional view of the centrifugal blade 22. The centrifugal blade 22 serving as a centrifugal blade located at the high-vacuum side has a generally disk-shaped base part 25 having a boss part 24, and a centrifugal blade element 22a formed on a surface of the base part 25. The boss part 24 has a through hole 24h, and the main shaft 1 passes through the through hole 24h. The centrifugal blade 22 is rotated in a clockwise direction in FIG. 11A.

The centrifugal blade element 22a comprises spiral centrifugal grooves as shown in FIG. 11A. The spiral centrifugal grooves constituting the centrifugal blade element 22a extend in such a direction as to cause the gas to flow counter to the direction of rotation (in a direction opposite to the direction of rotation). Each of the spiral centrifugal grooves extends from an outer peripheral surface of the boss part 24 to an outer periphery of the base part 25. The other centrifugal blades 22 have the same configuration as the uppermost stage centrifugal blade 22. The number and shape of the centrifugal grooves, the outer diameter of the boss part 24, and the length of flow passages defined by the centrifugal grooves may be changed as needed.

Figure 12A:
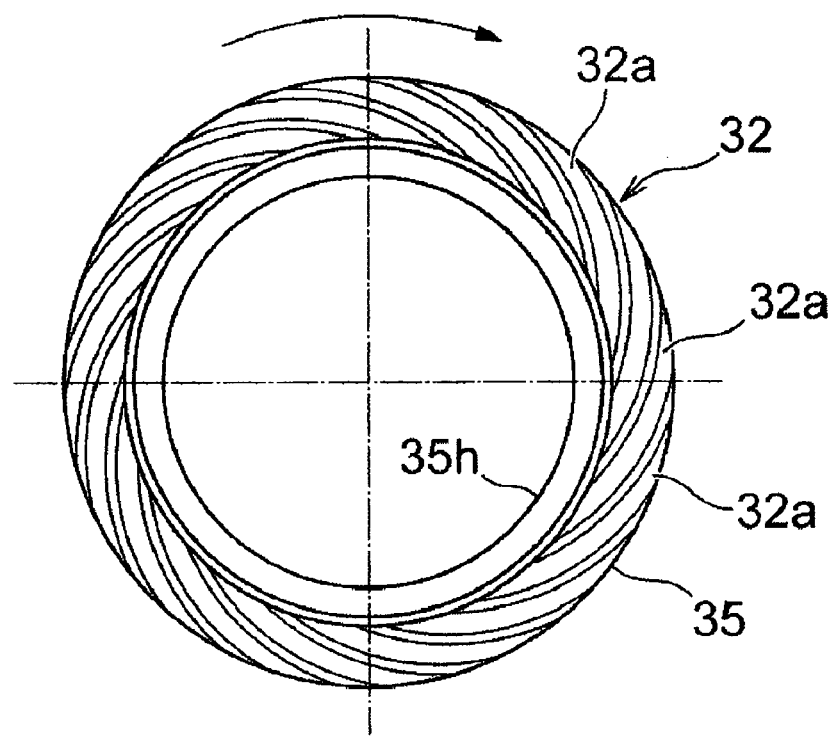
FIG. 12A is a plan view showing a centrifugal blade of a second centrifugal blade pumping section, and showing the uppermost stage turbine blade closest to the intake port of the casing.
Figure 12B:
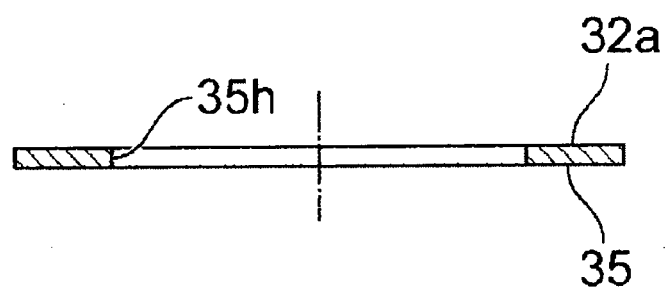
FIG. 12B is a front cross-sectional view showing the centrifugal blade of the second centrifugal blade pumping section.

FIGS. 12A and 12B are views showing the configuration of the centrifugal blades 32 of the second centrifugal blade pumping section 31. FIG. 12A is a plan view of the uppermost stage centrifugal blade 32 closest to the intake port 5 of the casing 2, and FIG. 12B is a front cross-sectional view of the centrifugal blade 32. The centrifugal blade 32 serving as a centrifugal blade located at the atmospheric pressure side has a generally disk-shaped base part 35, and a centrifugal blade element 32a formed on a surface of the base part 35. The base part 35 has a through hole 35h, and the main shaft 1 passes through the through hole 35h. The centrifugal blade 32 is rotated in a clockwise direction in FIG. 12A.

The centrifugal blade element 32a comprises spiral centrifugal grooves as shown in FIG. 12A. The spiral centrifugal grooves constituting the centrifugal blade element 32a extend in such a direction as to cause the gas to flow counter to the direction of rotation (in a direction opposite to the direction of rotation). Each of the spiral centrifugal grooves extends from an inner peripheral portion to an outer periphery of the generally disk-shaped base part 35. The other centrifugal blades 32 have the same configuration as the uppermost stage centrifugal blade 32. The number and shape of the centrifugal grooves, and the length of flow passages defined by the centrifugal grooves may be changed as needed.

As shown in FIGS. 11 and 12, in the case where the centrifugal blade 32 at the atmospheric pressure side is compared with the centrifugal blade 22 at the high-vacuum side, the grooves of the centrifugal blade element 32a of the centrifugal blade 32 at the atmospheric pressure side are set to be shallow (or the height of projections is set to be low), and the grooves of the centrifugal blade element 22a of the centrifugal blade 22 at the high-vacuum side are set to be deep (or the height of projections is set to be high). Specifically, as vacuum is higher, the centrifugal grooves of the centrifugal blade element are deeper (or the height of projections is higher) In short, as the degree of vacuum is higher, the evacuation velocity of the centrifugal blade is higher.

Next, the operation of the turbo vacuum pump shown in FIGS. 1 through 12 will be described in detail.

When the turbine blades 12 of the turbine blade pumping section 11 rotates, gas is introduced in the axial direction of the pump through the intake port 5 of the pump. The turbine blade 12 increases the evacuation velocity (discharge rate) and allows a relatively large amount of gas to be evacuated. The gas introduced from the intake port 5 passes through the uppermost turbine blade 12, and is then decreased in speed and increased in pressure by the stator blade 17. The gas is then discharged in the axial direction by the downstream turbine blades 12 and the downstream stator blades 17 in the same manner.

The gas flowing from the turbine blade pumping section 11 into the first centrifugal blade pumping section 21 is introduced into the uppermost stage centrifugal blade 22 and flows toward the outer peripheral part along the surface of the base part 25 of the centrifugal blade 22, and is compressed and discharged by a reciprocal action of the uppermost stage centrifugal blade 22 and the uppermost stage stator blade 23, that is, by a drag effect caused by the viscosity of the gas and a centrifugal effect caused by the rotation of the centrifugal blade element 22a. Specifically, the gas drawn by the uppermost stage centrifugal blade 22 is introduced in a generally axial direction 27 shown in FIG. 11B relative to the centrifugal blade 22, flows in a centrifugal direction 28 through the spiral centrifugal grooves toward the outer periphery of the centrifugal blade 22, and is compressed and discharged.

The gas compressed radially outward by the uppermost stage centrifugal blade 22 flows toward the uppermost stage stator blade 23, is directed in a generally axial direction by the inner peripheral surface of the stator blade 23, and flows into a space having the spiral guides (not shown) provided on the surface of the stator blade 23. By the rotation of the uppermost stage centrifugal blade 22, the gas flows toward the inner peripheral part along the surface of the uppermost stage stator blade 23 by a drag effect of the spiral guides of the stator blade 23 and the reverse side of the base part 25 of the uppermost stage centrifugal blade 22 caused by the viscosity of the gas, and is compressed and discharged. The gas having reached the inner peripheral part of the uppermost stage stator blade 23 is directed in the generally axial direction by the outer peripheral surface of the boss part 24 of the uppermost stage centrifugal blade 22, and flows toward the downstream centrifugal blade 22. Then, the gas is compressed and discharged in the same manner as described above by the downstream centrifugal blades 22 and the downstream stator blades 23.

The gas flowing from the first centrifugal blade pumping section 21 into the second centrifugal blade pumping section 31 is introduced into the uppermost stage centrifugal blade 32 and flows toward the outer peripheral part along the surface of the base part 35 of the uppermost stage centrifugal blade 32, and is compressed and discharged by a reciprocal action of the uppermost stage centrifugal blade 32 and the uppermost stage stator blade 33, that is, by a drag effect caused by the viscosity of the gas and a centrifugal effect caused by the rotation of the centrifugal blade element 32a. Then, the gas flows toward the uppermost stage stator blade 33, is directed in a generally axial direction by the inner peripheral surface of the stator blade 33, and flows into a space having the spiral guides (not shown) provided on the surface of the stator blade 33. By the rotation of the uppermost stage centrifugal blade 32, the gas flows toward the inner peripheral part along the surface of the uppermost stage stator blade 33 by a drag effect of the spiral guides of the stator blade 33 and the reverse side of the base part 35 of the uppermost stage centrifugal blade 32 caused by the viscosity of the gas, and is compressed and discharged. The gas having reached the inner peripheral part of the uppermost stage stator blade 33 is directed in the generally axial direction, and flows toward the downstream centrifugal blade 32. Then, the gas is compressed and discharged in the same manner as described above by the downstream centrifugal blades 32 and the downstream stator blades 33. Thereafter, the gas discharged from the second centrifugal blade pumping section 31 is discharged from the discharge port 6 to the outside of the vacuum pump.

Figure 13:
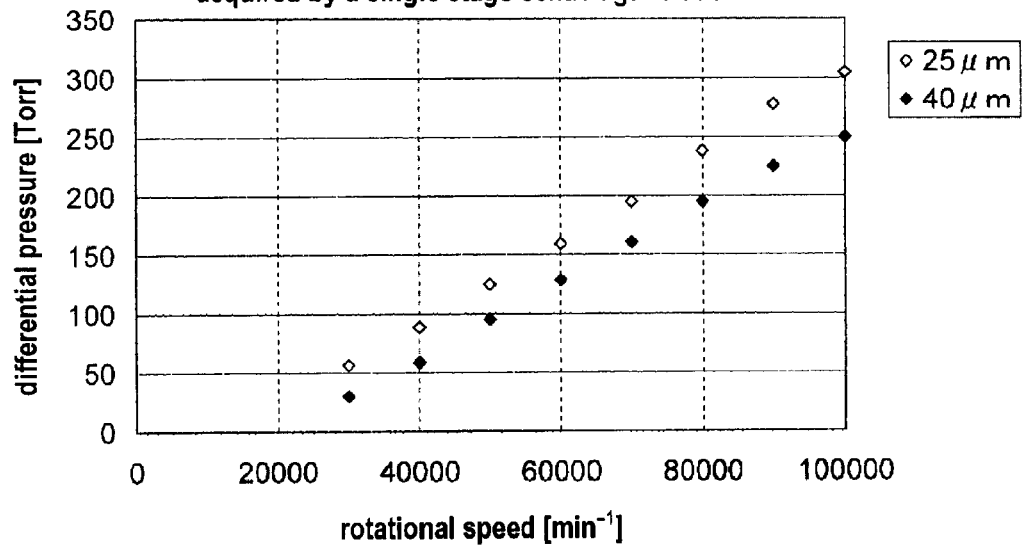
FIG. 13 is a graph showing performance comparison based on blade clearance in the turbo vacuum pump, and showing the relationship between differential pressure acquired by a single stage centrifugal blade and rotational speed at exhaust pressure of 760 Torr.

FIG. 13 is a graph showing performance comparison based on blade clearance in the turbo vacuum pump. FIG. 13 shows the relationship between differential pressure acquired by a single stage centrifugal blade and rotational speed. In FIG. 13, the horizontal axis represents rotational speed ($min^{-1}$) of the vacuum pump, and the vertical axis represents differential pressure (Torr). In FIG. 13, the case where blade clearance is 25 µm and the case where blade clearance is 40 µm are comparatively shown. As shown in FIG. 13, in the case where the blade clearance is 25 µm, the differential pressure of about 300 Torr can be acquired at the rotational speed of 100,000 rpm ($min^{-1}$) by a single stage centrifugal blade. In contrast, in the case where the blade clearance is 40 µm, the differential pressure of about 250 Torr can be acquired at the rotational speed of 100,000 rpm ($min^{-1}$) by a single stage centrifugal blade. Specifically, in the case where the blade clearance varies from 25 µm to 40 µm by 15 µm, the evacuation performance is lowered as shown in the graph. From this fact, the effect of the present invention in which the blade clearance can be set to be minute has been verified.

According to the above embodiments of the present invention, the magnetic bearings are used as radial bearings, but the gas bearings may be used. Further, the present invention has advantages at the atmospheric pressure range. At the upstream side of the blade element in this atmospheric pressure range, at least one of a cylindrical thread groove rotor, a centrifugal blade, and a turbine blade which have been used in a conventional turbo-molecular pump under vacuum of about 10 Torr or less may be employed. The evacuation principle of the centrifugal blade used in this vacuum range is the same as that of the centrifugal blade having minute clearance according to the present invention. However, because the degree of vacuum is high compared to the atmospheric pressure range, and countercurrent flow is small, blade clearance (about 0.1 to 1 mm) of general turbo-molecular pump may be sufficient without requiring minute blade clearance as in the centrifugal blade operable at the atmospheric pressure range.

The gas bearing may be dynamic pressure type or static pressure type, and both types have the same effect on the present invention. However, in the case of the static pressure type gas bearing, it is necessary to provide a gas supply means provided at the outside of the vacuum pump.

The turbo vacuum pump according to the first embodiment of the present invention shown in FIGS. 1 through 12 has the following advantages:

(1) Because the gas bearing is used as a bearing for supporting the rotor including the main shaft and the rotor blades fixed to the main shaft in a thrust direction, the rotor can be rotatably supported in an axial direction of the rotor with an accuracy of several micron meters ($\mu$m) to several tens of micron meters ($\mu$m). If the rotor is axially displaced due to a thrust force generated by differential pressure caused by a compression action of the pump, the rotor cannot be stably rotated due to the contact in the minute clearance portion of the gas bearing. In order to prevent such trouble from occurring, the displacement of the rotor is detected by the displacement sensor or the like (not shown) provided in the vicinity of the gas bearing, and the thrust magnetic bearing for canceling out the thrust force generated by the differential pressure attracts the rotor, thereby rotating the rotor stably.

(2) Because the gas bearing is used as a bearing for supporting the rotor including the main shaft and the rotor blades fixed to the main shaft in a thrust direction, the rotor can be rotatably supported in an axial direction of the rotor with an accuracy of several micron meters ($\mu$m) to several tens of micron meters ($\mu$m). If the rotor is axially displaced due to a thrust force generated by differential pressure caused by a compression action of the pump, the rotor cannot be stably rotated due to the contact in the minute clearance portion of the gas bearing. In order to prevent such trouble from occurring, the differential pressure between the discharge side and the intake side in the pumping section is measured by the vacuum gauge provided at the pump intake port or the interior of the pump, and measurement values are inputted into the control section of the thrust magnetic bearing, and then the thrust magnetic bearing for canceling out the thrust force generated by the differential pressure attracts the rotor, thereby rotating the rotor stably.

(3) The displacement sensor for measuring displacement (thermal deformation quantity) of the main shaft in the thrust direction is provided in the vicinity of the thrust magnetic bearing. Accordingly, the produced thrust load is corrected based on changed portion of the magnetic clearance caused by deformation of the main shaft, thereby suppressing the generation of excessive thrust force.

(4) By using the gas bearing and the thrust magnetic bearing for supporting the main shaft in the thrust direction, the clearance of the gas bearing can be maintained easily, and hence components constituting the gas bearing do not need severe machining accuracy, resulting in an inexpensive apparatus.

A turbo vacuum pump according to a second embodiment of the present invention will be described below with reference to FIGS. 15 through 21. Like or corresponding parts are denoted by like or corresponding reference numerals throughout drawings and will not be described below repetitively.

Figure 15:
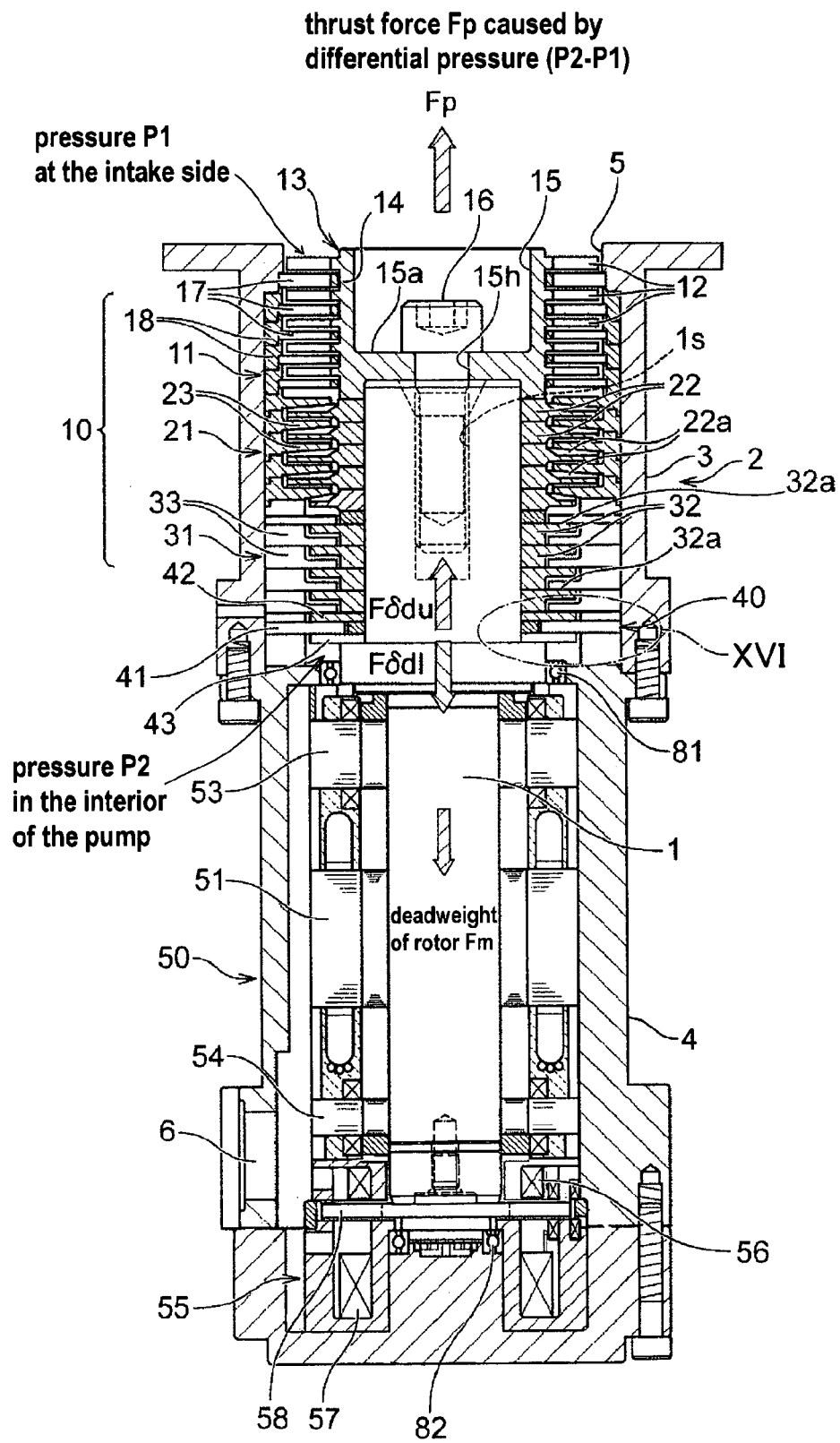
FIG. 15 is a cross-sectional view showing a turbo vacuum pump according to a second embodiment of the present invention.

FIG. 15 is a cross-sectional view showing a turbo vacuum pump according to the second embodiment of the present invention. As shown in FIG. 15, the turbo vacuum pump comprises a main shaft 1 extending over the substantially entire length of the pump, a pumping section 10 in which rotor blades and stator blades are alternately disposed in a casing 2, and a bearing and motor section 50 having a motor for rotating the main shaft 1 and bearings for rotatably supporting the main shaft 1. The casing 2 comprises an upper casing 3 for housing the pumping section 10 and a lower casing 4 for housing the bearing and motor section 50, and an intake port 5 is formed at the upper end portion of the upper casing 3 and a discharge port 6 is formed at the lower part of the lower casing 4.

The pumping section 10 comprises a turbine blade pumping section 11, a first centrifugal blade pumping section 21 and a second centrifugal blade pumping section 31 which are arranged in series from the intake port side to the lower part of the upper casing 3 in the same manner as the turbo vacuum pump shown in FIG. 1. The turbine blade pumping section 11, the first centrifugal blade pumping section 21 and the second centrifugal blade pumping section 31 have the same respective structures as those of the turbo vacuum pump shown in FIG. 1.

A gas bearing 40 is provided at immediately downstream side of the second centrifugal blade pumping section 31 to support the rotor including the main shaft 1 and the rotor blades 12, 22, 32 fixed to the main shaft 1 in a thrust direction.

Figure 16:
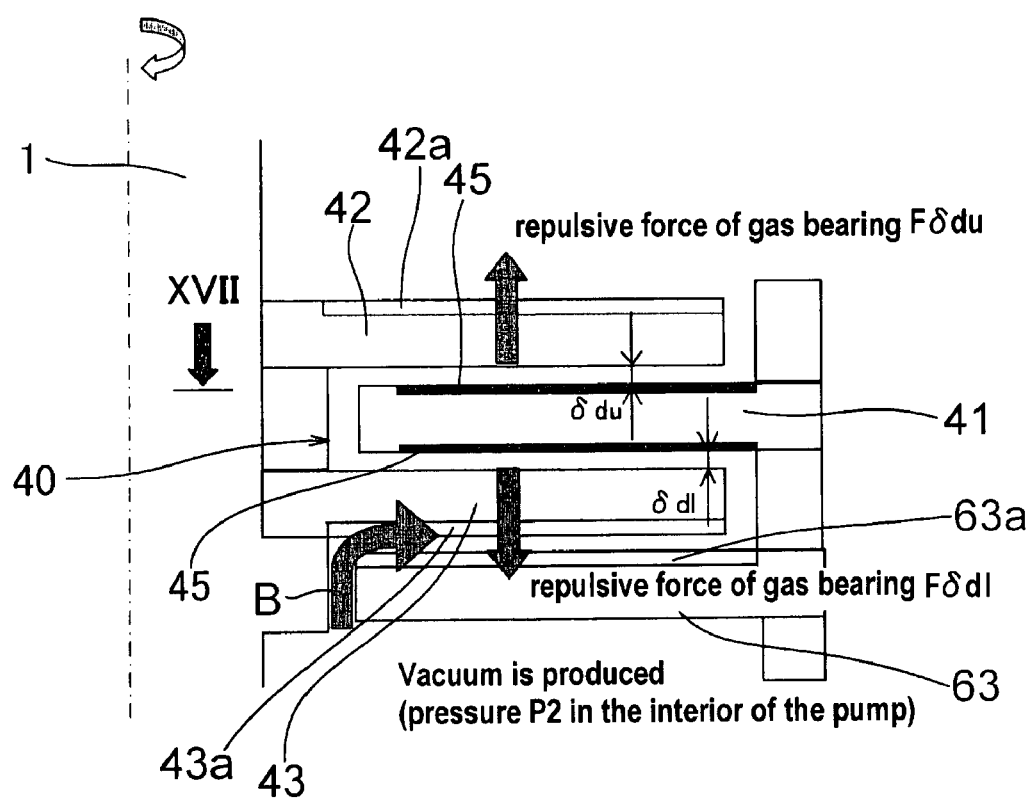
FIG. 16 is a view showing XVI part of FIG. 15, and an enlarged view showing a gas bearing and peripheral part of the gas bearing.

FIG. 16 is a view showing XVI part of FIG. 15, and an enlarged view showing the gas bearing 40 and peripheral part of the gas bearing 40. As shown in FIG. 16, the gas bearing 40 comprises a stationary member (stationary part) 41 fixed to the upper casing 3, and an upper rotating member (upper rotating part) 42 and a lower rotating member (lower rotating part) 43 which are disposed above and below the stationary member (stationary part) 41 so as to place the stationary member (stationary part) 41 between the upper rotating member (upper rotating part) 42 and the lower rotating member (lower rotating part) 43. The upper rotating member (upper rotating part) 42 and the lower rotating member (lower rotating part) 43 are fixed to the main shaft 1. Spiral grooves 45, 45 are formed in both surfaces of the stationary member 41.

Specifically, the stationary member (stationary part) 41 having the spiral grooves 45, 45 is placed between the upper and lower divided members (parts), i.e. the upper rotating member (upper rotating part) 42 and the lower rotating member (lower rotating part) 43. A centrifugal blade element 42a for compressing and evacuating gas in a radial direction is formed on a surface of the upper rotating member (upper rotating part) 42 having an opposite surface which faces the spiral grooves 45 of the stationary member (stationary part) 41. The centrifugal blade element 42a comprises centrifugal blade grooves for compressing and evacuating gas in a radial direction.

Further, a centrifugal blade element 43a for compressing and evacuating gas in a radial direction is formed on a surface of the lower rotating member (lower rotating part) 43 having an opposite surface which faces the spiral grooves 45 of the stationary member (stationary part) 41. The centrifugal blade element 43a comprises centrifugal blade grooves for compressing and evacuating gas in a radial direction. A centrifugal blade element 63a for compressing and evacuating gas in a radial direction is formed on a surface of the stator blade 63 which faces the lower rotating member (lower rotating part) 43 in an axial direction. The centrifugal blade element 43a, 63a should be provided on at least one of the lower rotating member (lower rotating part) 43 and the stator blade 63 which faces the lower rotating member (lower rotating part) 43 in the axial direction.

Figure 17:
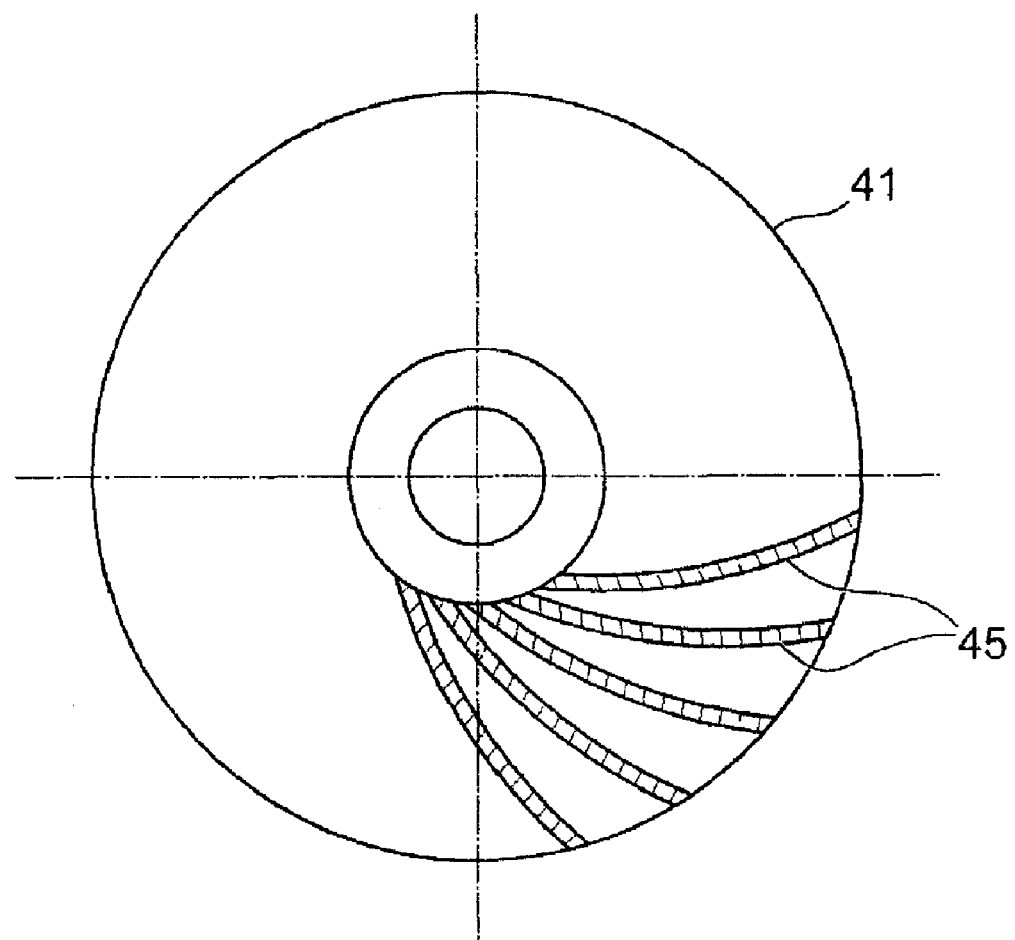
FIG. 17 is a view as viewed from an arrow XVII of FIG. 16.

FIG. 17 is a view as viewed from an arrow XVII of FIG. 16. As shown in FIG. 17, a number of spiral grooves 45 are formed in the surface of the stationary member (stationary part) 41 over the substantially entire surface of the stationary member (stationary part) 41 (in FIG. 17, part of spiral grooves are shown).

As shown in FIG. 16, because the gas bearing 40 is used as a bearing for supporting the rotor including the main shaft 1 and the rotor blades fixed to the main shaft 1 in a thrust direction, the rotor can be rotatably supported in an axial direction of the rotor with an accuracy of several micron meters (μm) to several tens of micron meters (μm). The centrifugal blade element 42a for compressing gas in a radial direction is integrally formed on the rotor part constituting a part of the gas bearing 40, i.e. the upper rotating member (upper rotating part) 42. Because the minute clearance of the gas bearing 40 and the minute clearance of the centrifugal blades are in the same thrust direction, the blade clearance of the centrifugal blade element 42a can be set to be substantially equal to the clearance of the gas bearing 40 or to be slightly larger than the clearance of the gas bearing 40. Specifically, because the centrifugal blade element 42a for compressing gas in the radial direction is formed on the upper rotating member (upper rotating part) 42, the upper rotating member (upper rotating part) 42 constitutes a centrifugal blade as well as a part of the gas bearing 40 for axial positioning of the rotor. In this manner, since the centrifugal blade element 42a for compressing gas in the radial direction is formed on the upper rotating member (upper rotating part) 42 for axial positioning, the blade clearance of the centrifugal blade element 42a can be controlled with high accuracy.

Further, the rotor including the main shaft 1 and the rotor blade fixed to the main shaft 1 is subjected to a thrust force caused by the differential pressure generated by the compression action. A centrifugal blade element 43a (63a) for compressing and evacuating gas in a radial direction is formed on at least one of a surface of the lower rotating member (lower rotating part) 43 having an opposite surface which faces the spiral grooves 45 of the stationary member (stationary part) 41 and a surface of the stator blade 63 which faces the lower rotating member (lower rotating part) 43. Thus, vacuum is produced in the pump, and hence the thrust force generated by the differential pressure can be reduced and the rotor can be stably rotated. This feature will be described below.

FIG. 15 shows equilibrium of force in the case where the vacuum pump is vertically installed. As shown in FIG. 15, various forces are taken as follows:

Thrust force caused by differential pressure between the discharge side (pressure P2 at the discharge side) and the intake side (pressure P1 at the intake side) generated by an evacuation action of the pumping section: Fp Deadweight of the rotor: Fm Upward repulsive force generated by the gas bearing 40: Fδdu (δdu means an upper clearance of the gas bearing)

Downward repulsive force generated by the gas bearing 40: Fδdl (δdl means an lower clearance of the gas bearing)

Then, the equilibrium of forces is expressed in the following equation:

$$Fp+F\delta du=Fm+F\delta dl$$

If the thrust force Fp caused by the differential pressure is large (the thrust force FP is considerably larger than the deadweight Fm of the rotor), the downward repulsive force Fδdl must be larger than the upward repulsive force Fδdu in the gas bearing, and the difference between Fδdl and Fδdu must be large. In order to satisfy this condition, the clearance δdl of the gas bearing 40 is required to be very small, and thus it is highly likely that contact occurs at the minute clearance of the gas bearing 40.

According to the present invention, as shown in FIG. 16, a centrifugal blade element 43a (63a) for compressing and evacuating gas in a radial direction is formed on at least one of a surface of the lower rotating member (lower rotating part) 43 having an opposite surface which faces the spiral grooves 45 of the stationary member (stationary part) 41 and a surface of the stator blade 63 which faces the lower rotating member (lower rotating part) 43. Therefore, gas can be compressed and evacuated from the discharge side to the intake side by the centrifugal blade element 43a (63a) as shown by an arrow B in FIG. 16. Thus, vacuum is produced in the interior of the pump, and hence the thrust force Fp generated by the differential pressure P2-P1 can be reduced and the clearance δdl of the gas bearing 40 can be maintained at a desired magnitude. Therefore, contact at the clearance portion of the gas bearing 40 can be prevented, and the rotor can be stably rotated.

Next, the bearing and motor section 50 will be described in detail. As shown in FIG. 15, the bearing and motor section 50 comprises a motor 51 for rotating the main shaft 1, an upper radial magnetic bearing 53 and a lower radial magnetic bearing 54 for rotatably supporting the main shaft 1 in a radial direction, and a thrust magnetic bearing 55 for canceling out a thrust force generated by the differential pressure between the discharge side and the intake side by an evacuation action of the pumping section 10. The motor 51 comprises a high-frequency motor. The upper radial magnetic bearing 53, the lower radial magnetic bearing 54 and the thrust magnetic bearing 55 comprise an active magnetic bearing. In order to prevent the rotor blade and the stator blade from being brought into contact with each other when an abnormality occurs in one of the magnetic bearings 53, 54, 55, an upper touchdown bearing 81 and a lower touchdown bearing 82 are provided to support the main shaft 1 in a radial direction and an axial direction.

The thrust magnetic bearing 55 comprises an upper thrust magnetic bearing 56 having electromagnet, a lower thrust magnetic bearing 57 having electromagnet, and a target disk 58 fixed to the lower part of the main shaft 1. In the thrust magnetic bearing 55, the target disk 58 is held between the upper thrust magnetic bearing 56 and the lower thrust magnetic bearing 57, and the target disk 58 is attracted by the electromagnets of the upper and lower thrust magnetic bearings 56, 57 to cancel out a thrust force generated by the differential pressure between the discharge side and the intake side by an evacuation action of the pumping section 10.

As described above, a centrifugal blade element 43a (63a) for compressing and evacuating gas in a radial direction is formed on at least one of a surface of the lower rotating member (lower rotating part) 43 having an opposite surface which faces the spiral grooves 45 of the stationary member (stationary part) 41 and a surface of the stator blade 63 which faces the lower rotating member (lower rotating part) 43. Therefore, vacuum is produced in the interior of the pump, and hence the thrust force Fp generated by the differential pressure can be reduced. In the thrust magnetic bearing 55, the target disk 58 is attracted by the electromagnets of the upper and lower thrust magnetic bearings 56, 57 to completely cancel out a thrust force generated by the differential pressure between the discharge side and the intake side by an evacuation action of the pumping section 10. Thus, the upper clearance and the lower clearance of the gas bearing 40 can be equal to each other (δdu=δdl). Since the differential pressure between the discharge side and the intake side can be small by the centrifugal blade element 43a (63a), the capacity of the thrust magnetic bearing 55 can be small.

Figure 18:
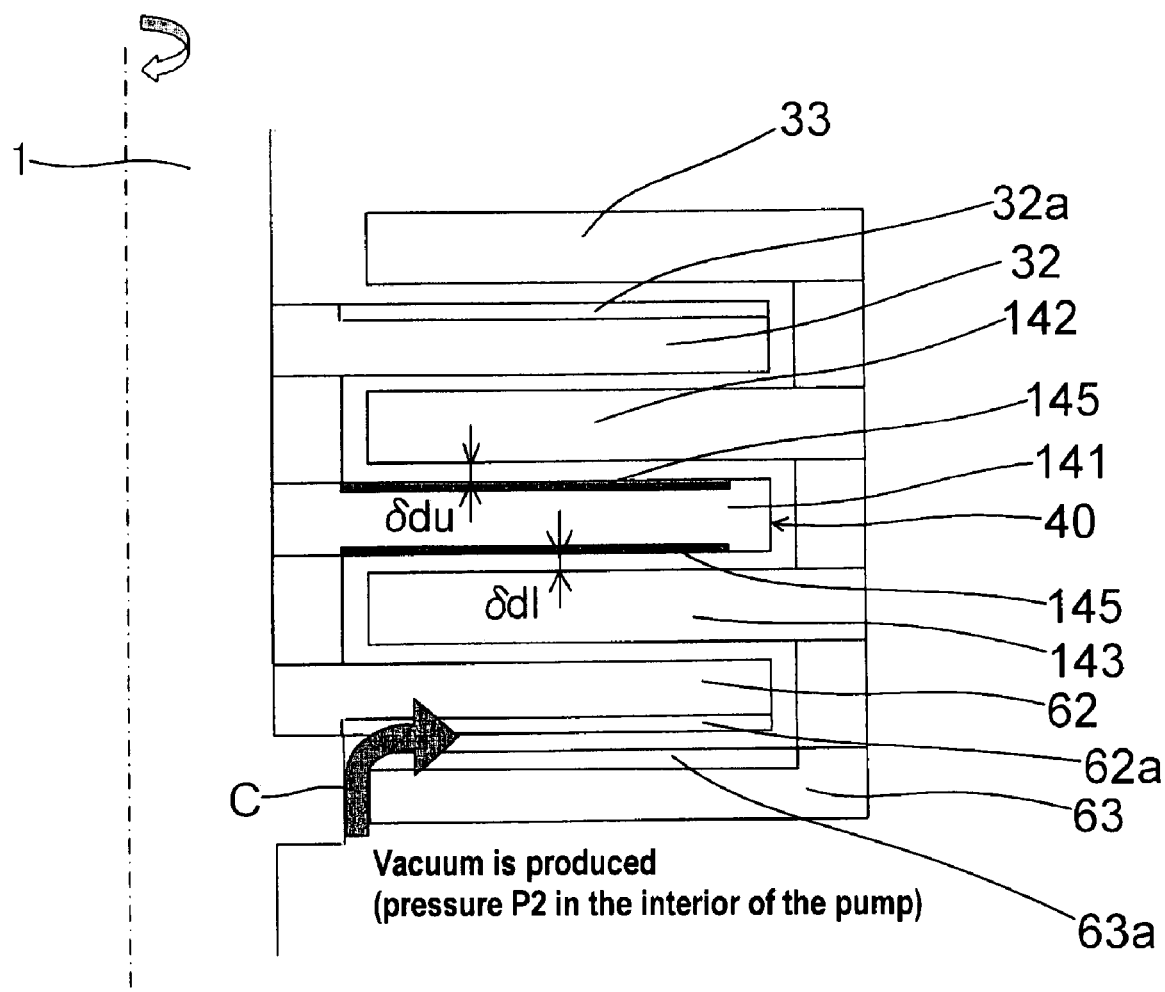
FIG. 18 is an enlarged view showing a gas bearing and peripheral part of the gas bearing according to another embodiment.

FIG. 18 is an enlarged view showing the gas bearing 40 and peripheral part of the gas bearing 40 according to another embodiment. As shown in FIG. 18, the gas bearing 40 comprises a rotating member (rotating part) 141 fixed to the main shaft 1, and an upper stationary member (upper stationary part) 142 and a lower stationary member (lower stationary part) 143 which are disposed above and below the rotating member (rotating part) 141 so as to place the rotating member (rotating part) 141 between the upper stationary member (upper stationary part) 142 and the lower stationary member (lower stationary part) 143. The upper stationary member (upper stationary part) 142 and the lower stationary member (lower stationary part) 143 are fixed to the upper casing 3. Spiral grooves 145, 145 are formed in both surfaces of the rotating member (rotating part) 141.

Specifically, the rotating member (rotating part) 141 having the spiral grooves 145, 145 is placed between the upper and lower divided members (parts), i.e. the upper stationary member (upper stationary part) 142 and the lower stationary member (lower stationary part) 143.

Further, as shown in FIG. 18, the rotor blade 32 and the stator blade 33 are disposed above the upper stationary member (upper stationary part) 142 constituting the gas bearing 40, and a centrifugal blade element 32a is formed on a blade evacuation surface of the rotor blade 32. The centrifugal blade element 32a comprises centrifugal blade grooves for compressing and evacuating gas in a radial direction.

According to the embodiment shown in FIG. 18, the rotor blade 62 and the stator blade 63 are disposed below the lower stationary member (lower stationary part) 143 constituting the gas bearing 40, and a centrifugal blade element 62a for compressing and evacuating gas in a radial direction is formed on a surface of the rotor blade 62 having an opposite surface which faces the lower stationary member (lower stationary part) 143 in an axial direction. A centrifugal blade element 63a for compressing and evacuating gas in a radial direction is formed on a surface of the stator blade 63 which faces the rotor blade 62 in an axial direction. The centrifugal blade element 62a, 63a should be provided on at least, one of a surface of the rotor blade 62 having an opposite surface which faces the lower stationary member (lower stationary part) 143 in an axial direction and a surface of the stator blade 63 which faces the rotor blade 62 in an axial direction.

According to the embodiment shown in FIG. 18, as with the embodiment shown in FIG. 16, because the gas bearing 40 is used as a bearing for supporting the rotor in a thrust direction, the rotor can be rotatably supported in an axial direction of the rotor with an accuracy of several micron meters (μm) to several tens of micron meters (μm).

According to the present embodiment, as shown in FIG. 18, because the centrifugal blade element 62a (63a) is formed on at least one of a surface of the rotor blade 62 having an opposite surface which faces the lower stationary member (lower stationary part) 143 in an axial direction and a surface of the stator blade 63 which faces the rotor blade 62 in an axial direction, gas can be compressed and evacuated from the discharge side to the intake side by the centrifugal blade element 62a (63a) as shown by an arrow C of FIG. 18. Thus, vacuum is produced in the interior of the pump, and hence the thrust force Fp generated by the differential pressure P2-P1 between the discharge side (pressure P2 at the discharge side) and the intake side (pressure P1 at the intake side) can be reduced and the clearance δd1 of the gas bearing 40 can be maintained at a desired magnitude. Therefore, contact at the clearance portion of the gas bearing 40 can be prevented, and the rotor can be stably rotated.

Figure 19:
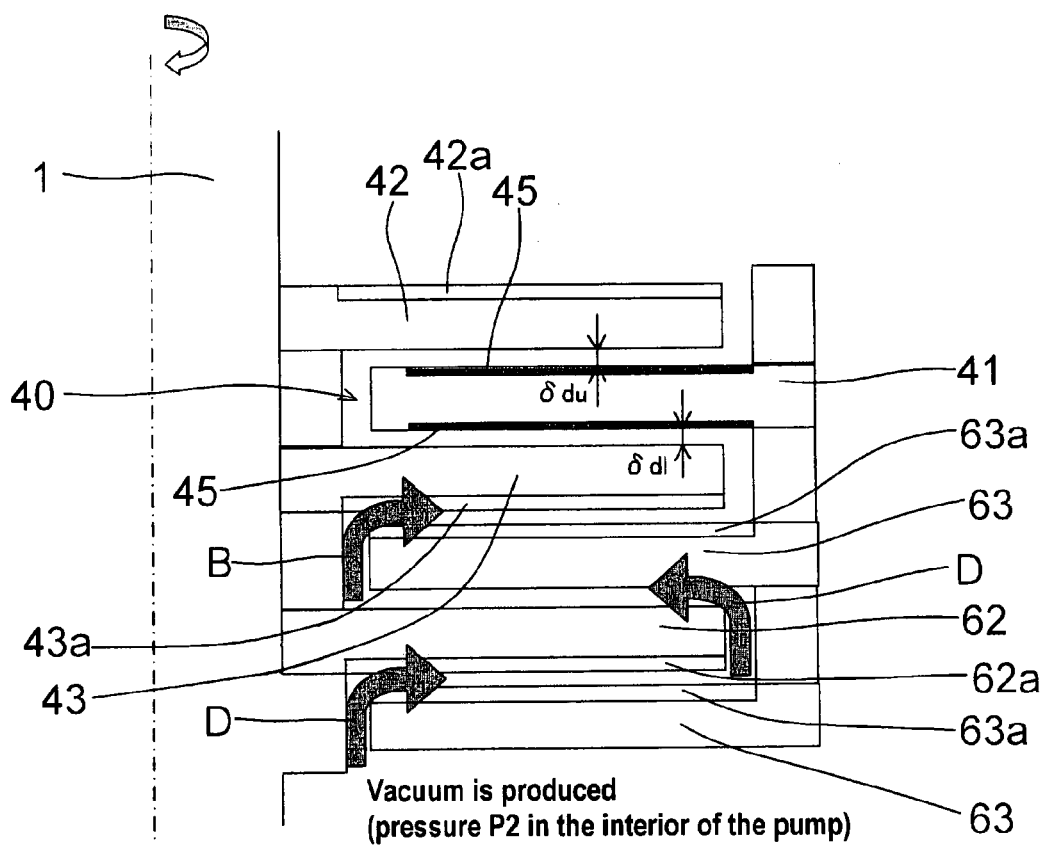
FIG. 19 is an enlarged view showing a gas bearing and peripheral part of the gas bearing according to still another embodiment.

FIG. 19 is an enlarged view showing the gas bearing 40 and peripheral part of the gas bearing 40 according to still another embodiment. The structure of the gas bearing shown in FIG. 19 is the same as the structure of the gas bearing shown in FIG. 16. Specifically, the gas bearing 40 comprises a stationary member (stationary part) 41 fixed to the upper casing 3, and an upper rotating member (upper rotating part) 42 and a lower rotating member (lower rotating part) 43 which are disposed above and below the stationary member (stationary part) 41 so as to place the stationary member (stationary part) 41 between the upper rotating member (upper rotating part) 42 and the lower rotating member (lower rotating part) 43. The upper rotating member (upper rotating part) 42 and the lower rotating member (lower rotating part) 43 are fixed to the main shaft 1. Spiral grooves 45, 45 are formed in both surfaces of the stationary member 41.

Specifically, the stationary member (stationary part) 41 having the spiral grooves 45, 45 is placed between the upper and lower divided members (parts), i.e. the upper rotating member (upper rotating part) 42 and the lower rotating member (lower rotating part) 43. A centrifugal blade element 42a for compressing and evacuating gas in a radial direction is formed on a surface of the upper rotating member (upper rotating part) 42 having an opposite surface which faces the spiral grooves 45 of the stationary member (stationary part) 41. A centrifugal blade element 43a (63a) is formed on at least one of a surface of the lower rotating member (lower rotating part) 43 having an opposite surface which faces the spiral grooves 45, 45 of the stationary member 41 and a surface of the stator blade 63 which faces the lower rotating member (lower rotating part) 43 in an axial direction.

According to the embodiment shown in FIG. 19, plural stages of the rotor blades 62 and the stator blades 63 are disposed below the lower rotating member (lower rotating part) 43 constituting the gas bearing 40, and a centrifugal blade element 62a for compressing and evacuating gas in a radial direction is formed on a blade evacuation surface at a lower end of the rotor blade 62. A centrifugal blade element 63a for compressing and evacuating gas in a radial direction is formed on a blade evacuation surface at an upper end of the stator blade 63. The centrifugal blade element 62a, 63a should be provided on at least one of a surface of the rotor blade 62 and a surface of the stator blade 63 which faces the rotor blade 62 in an axial direction.

According to the embodiment shown in FIG. 19, because the centrifugal blade element 43a (63a) is formed on at least one of a surface of the lower rotating member (lower rotating part) 43 having an opposite surface which faces the spiral grooves 45, 45 of the stationary member 41 and a surface of the stator blade 63 which faces the lower rotating member (lower rotating part) 43 in an axial direction. In addition, the centrifugal blade element 62a (63a) for compressing and evacuating gas in a radial direction is formed on at least one of the rotor blade 62 and the stator blade 63 disposed below the lower rotating member (lower rotating part) 43. Thus, in addition to the evacuation action (shown by an arrow B) by the centrifugal blade element 43a (63a), gas can be compressed and evacuated from the discharge side to the intake side by the centrifugal blade element 62a (63a) in the lower stage of the centrifugal blade element 43a (63a) (shown by an arrow D). In this manner, according to the embodiment shown in FIG. 19, because plural stages of the centrifugal blade elements for compressing and evacuating gas in a radial direction are provided to develop vacuum in the interior of the pump, vacuum pressure in the pump can be further lowered.

Thus, the thrust force Fp generated by the differential pressure between the discharge side (pressure P2 at the discharge side) and the intake side (pressure P1 at the intake side) can be reduced. Accordingly, the clearance δdl of the gas bearing 40 can be maintained at a desired magnitude, contact at the clearance portion of the gas bearing 40 can be prevented, and the rotor can be stably rotated.

Figure 20:
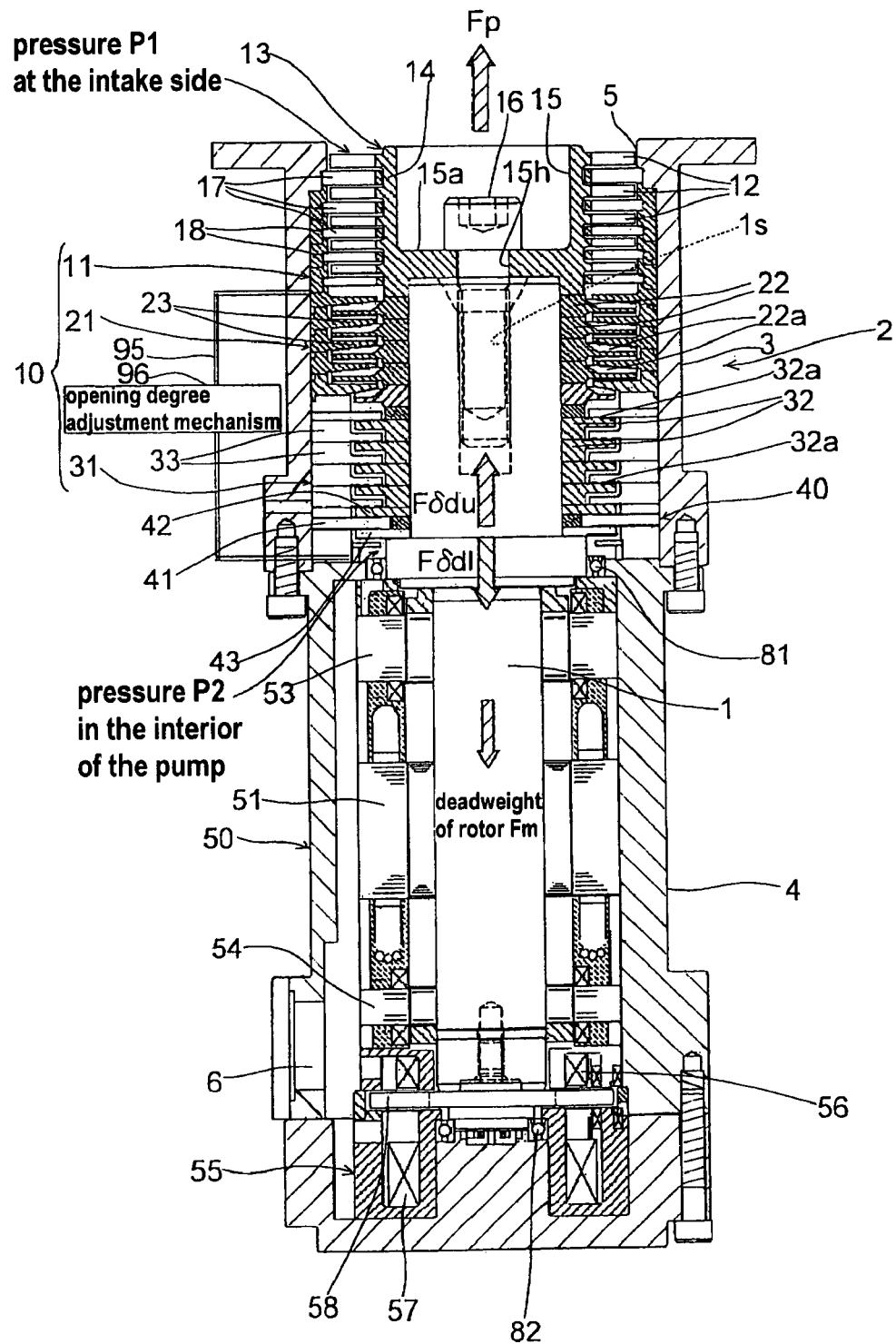
FIG. 20 is a vertical-cross sectional view showing a modified example of the turbo vacuum pump according to the present invention.

FIG. 20 is a vertical-cross sectional view showing a modified example of the embodiment of the turbo vacuum pump according to the present invention. The turbo vacuum pump shown in FIG. 20 has structure in which a bypass line is added to the turbo vacuum pump shown in FIG. 15. Specifically, in the present embodiment shown in FIG. 20, a bypass line 95 for connecting the pumping section 10 and the interior of the pump at the downstream side of the pumping section 10 is provided. One end of the bypass line 95 is connected to a location close to a boundary between the turbine blade pumping section 11 constituting the uppermost stage blade pumping section and the turbine blade pumping section 21 constituting the next stage blade pumping section, and the other end of the bypass line 95 is connected to the interior of the pump located at immediately downstream side of the gas bearing 40. An opening degree adjustment mechanism 96 for adjusting an opening degree of a flow passage is provided in the bypass line 95. The opening degree adjustment mechanism 96 comprises a metering valve for regulating minute flow rate, for example. The metering valve is configured to adjust the opening degree of the flow passage by vertical motion of a tapered stem tip inserted in an orifice, thereby regulating the flow rate. The inner diameter of the orifice is in the range of 0.81 to 3.25 mm, for example, and the taper angle of the stem tip is in the range of 1 to 5°, for example. The material of the stem tip is brass or 316 stainless steel.

The gas bearing 40 and the blade elements at peripheral part of the gas bearing 40 have the same structure as those in the embodiment shown in FIGS. 16 through 19.

The connecting location of the one end of the bypass line 95 may be any location as long as the connecting location is within the pumping section 10 in which vacuum is produced, and the connecting location of the other end of the bypass line 95 may be any location as long as the connecting location is located in the interior of the pump at the downstream side of the gas baring 40.

According to the turbo vacuum pump shown in FIG. 20, because the pumping section 10 and the interior of the pump located at the downstream side of the pumping section 10 are connected to each other, vacuum is produced in the interior of the pump at the downstream side of the pumping section 10. Thus, the thrust force Fp generated by the differential pressure P2-P1 between the discharge side (pressure P2 at the discharge side) and the intake side (pressure P1 at the intake side) can be reduced and the clearance δdl of the gas bearing 40 can be maintained at a desired magnitude. Therefore, contact at the clearance portion of the gas bearing 40 can be prevented, and the rotor can be stably rotated.

Further, because it is possible to control the pressure P2 in the interior of the pump by the opening degree adjustment mechanism 96 provided in the bypass line 95, the thrust force Fp can be controlled, and the axial position of the rotor can be controlled.

Figure 21:
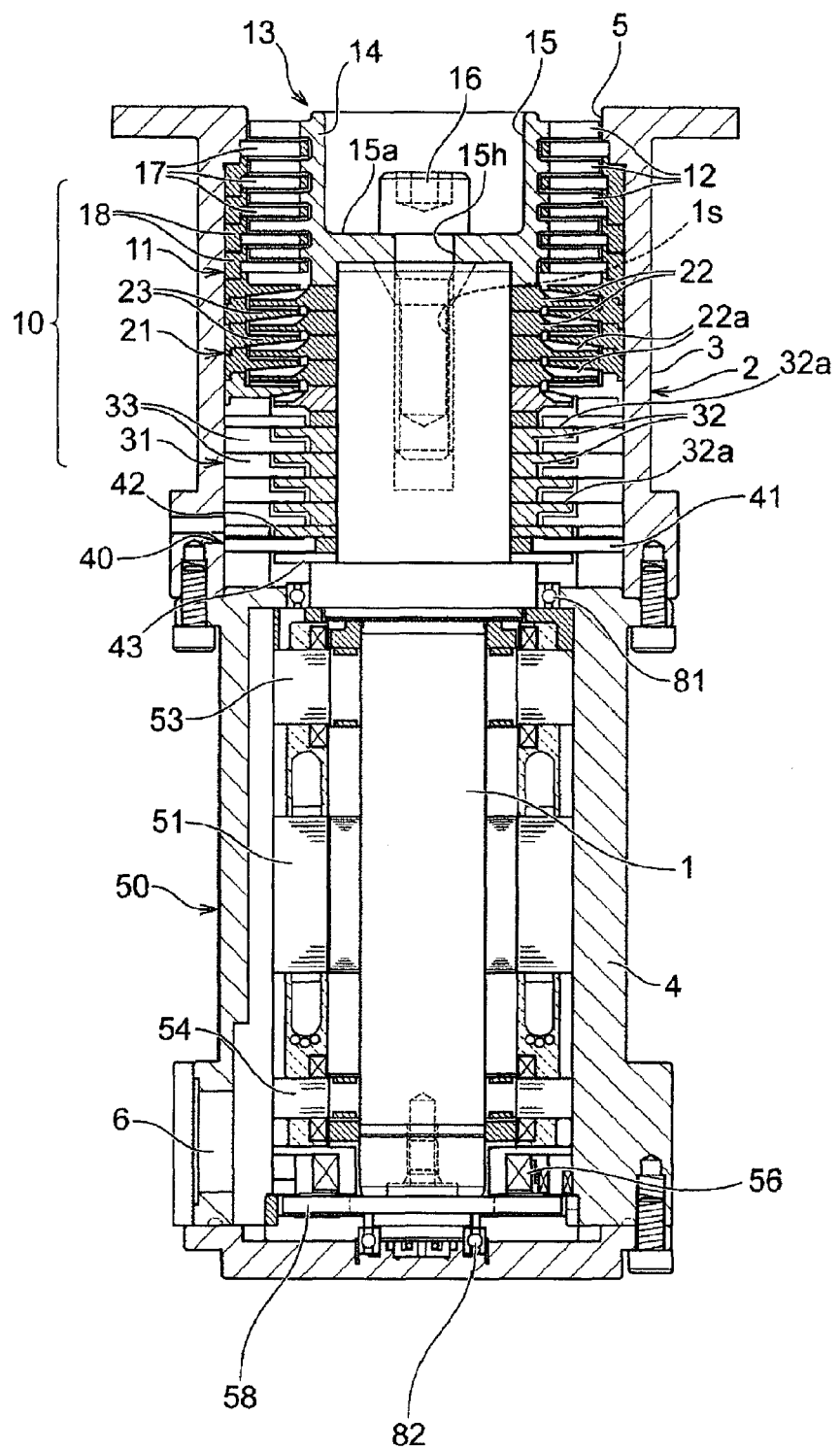
FIG. 21 is a vertical cross-sectional view showing another modified example of the turbo vacuum pump according to the present invention.

FIG. 21 is a vertical cross-sectional view showing another modified example of the turbo vacuum pump according to the present invention. Although the turbo vacuum pump shown in FIGS. 15 through 20 has the thrust magnetic bearing 55 for canceling out a thrust force generated by the differential pressure between the discharge side and the intake side by an evacuation action of the pumping section 10, the turbo vacuum pump shown in FIG. 21 has an upper thrust magnetic bearing in place of the thrust magnetic bearing 55. Specifically, the bearing and motor section 50 comprises a motor 51 for rotating the main shaft 1, an upper radial magnetic bearing 53 and a lower radial magnetic bearing 54 for rotatably supporting the main shaft 1 in a radial direction, and an upper thrust magnetic bearings 56 for attracting the rotor in an axial direction. The motor 51 comprises a high-frequency motor. The upper radial magnetic bearing 53, the lower radial magnetic bearing 54 and the upper thrust magnetic bearing 56 comprise an active magnetic bearing. The upper thrust magnetic bearing 56 is configured to attract a target disk 58 by electromagnet, and thus the rotor is attracted in an axial direction.

The turbo vacuum pump shown in FIG. 21 may have the centrifugal blade elements shown in FIGS. 16 through 19, and also have the bypass line shown in FIG. 20.

According to the present invention, because it is possible to produce vacuum in the interior of the pump by the centrifugal blade elements or the bypass line, the thrust force Fp generated by the differential pressure P2-P1 can be reduced. Accordingly, only the upper thrust magnetic bearing 56 may be provided as shown in FIG. 21.

Further, the structure of the blade elements of the pumping section 10 in the turbo vacuum pump shown in FIGS. 15 through 21 is the same as that of the blade elements shown in FIGS. 9 through 12. Specifically, the turbine blade unit 13 of the turbine blade pumping section 11 is shown in FIGS. 9A and 9B. The stator blade 17 of the turbine blade pumping section 11 is shown in FIGS. 10A, 10B and 10C. The centrifugal blade 22 of the first centrifugal blade pumping section 21 is shown in FIGS. 11A and 11B. The centrifugal blade 32 of the second centrifugal blade pumping section 31 is shown in FIGS. 12A and 12B.

The evacuation action of the turbo vacuum pump shown in FIGS. 15 through 21 is the same as that of the turbo vacuum pump shown in FIGS. 1 through 12. The performance comparison based on blade clearance in the turbo vacuum pump is the same as the graph shown in FIG. 13.

The turbo vacuum pump according to the second embodiment of the present invention shown in FIGS. 15 through 21 has the following advantages:

(1) Because the gas bearing is used as a bearing for supporting the rotor including the main shaft and the rotor blades fixed to the main shaft in a thrust direction, the rotor can be rotatably supported in an axial direction of the rotor with an accuracy of several micron meters (μm) to several tens of micron meters (μm). Further, because the centrifugal blade element for compressing and evacuating gas in a radial direction is formed, gas can be compressed and evacuated from the discharge side to the intake side by the centrifugal blade element. Thus, vacuum is produced in the interior of the pump, and hence the thrust force generated by the differential pressure between the discharge side and the intake side can be reduced and the clearance of the gas bearing can be maintained at a desired magnitude. Therefore, contact at the clearance portion of the gas bearing can be prevented, and the rotor can be stably rotated.

(2) Because the blade pumping section and the interior of the pump located at the downstream side of the blade pumping section are connected to each other, vacuum is produced in the interior of the pump at the downstream side of the blade pumping section. Thus, the differential pressure between the discharge side and the intake side becomes small, and the thrust force generated by the differential pressure becomes small. Therefore, the clearance of the gas bearing can be maintained at a desired magnitude, contact at the clearance portion of the gas bearing can be prevented, and the rotor can be stably rotated.

(3) Because it is possible to control the vacuum pressure in the interior of the pump by the opening degree adjustment mechanism provided in the bypass line, the thrust force can be controlled, and the axial position of the rotor can be controlled.

Although certain preferred embodiments of the present invention have been shown and described in detail, it should be understood that various changes and modifications may be made therein without departing from the scope of the appended claims.

What is claimed is:

1. A turbo vacuum pump comprising:
   a casing;
   a pumping section having rotor blades and stator blades which are disposed alternately in said casing;
   a main shaft for supporting said rotor blades; and
   a bearing and motor section having a motor for rotating said main shaft and a bearing mechanism for supporting said main shaft rotatably;
   wherein a gas bearing is used as a bearing for supporting said main shaft in a thrust direction, spiral grooves are formed in both surfaces of a stationary part of said gas bearing, and said stationary part having said spiral grooves is placed between an upper rotating part and a lower rotating part which are fixed to said main shaft; and
   wherein a thrust magnetic bearing for canceling out a thrust force generated by the differential pressure between a discharge side and an intake side by an evacuation action of said pumping suction is provided, and a displacement sensor for measuring an axial displacement of a rotor having said main shaft is provided.

2. The turbo vacuum pump according to claim 1, wherein said displacement sensor is provided in the vicinity of said gas bearing.

3. The turbo vacuum pump according to claim 1, wherein said displacement sensor comprises an eddy current sensor or an inductive sensor.

4. The turbo vacuum pump according to claim 3, wherein surface treatment composed of a conductive material or a magnetic material is applied to a target area of said rotor targeted by said displacement sensor.

5. The turbo vacuum pump according to claim 3, wherein a thin plate composed of a conductive material or a magnetic material is provided in a target area of said rotor targeted by said displacement sensor.

6. The turbo vacuum pump according to claim 1, wherein a displacement sensor for measuring an axial displacement of said main shaft is provided in the vicinity of said thrust magnetic bearing.

7. A turbo vacuum pump comprising:
   a casing;
   a pumping section having rotor blades and stator blades which are disposed alternately in said casing;
   a main shaft for supporting said rotor blades; and
   a bearing and motor section having a motor for rotating said main shaft and a bearing mechanism for supporting said main shaft rotatably;
   wherein a gas bearing is used as a bearing for supporting said main shaft in a thrust direction, spiral grooves are formed in both surfaces of a rotating part of said gas bearing fixed to said main shaft, and said rotating part having said spiral grooves is placed between an upper stationary part and a lower stationary part; and
   wherein a thrust magnetic bearing for canceling out a thrust force generated by the differential pressure between a discharge side and an intake side by an evacuation action of said pumping suction is provided, and a displacement sensor for measuring an axial displacement of a rotor having said main shaft is provided.

8. The turbo vacuum pump according to claim 7, wherein said displacement sensor is provided in the vicinity of said gas bearing.

9. The turbo vacuum pump according to claim 7, wherein said displacement sensor comprises an eddy current sensor or an inductive sensor.

10. The turbo vacuum pump according to claim 9, wherein surface treatment composed of a conductive material or a magnetic material is applied to a target area of said rotor targeted by said displacement sensor.

11. The turbo vacuum pump according to claim 9, wherein a thin plate composed of a conductive material or a magnetic material is provided in a target area of said rotor targeted by said displacement sensor.

12. The turbo vacuum pump according to claim 7, wherein a displacement sensor for measuring an axial displacement of said main shaft is provided in the vicinity of said thrust magnetic bearing.

13. A turbo vacuum pump comprising:
    a casing;
    a pumping section having rotor blades and stator blades which are disposed alternately in said casing;
    a main shaft for supporting said rotor blades; and
    a bearing and motor section having a motor for rotating said main shaft and a bearing mechanism for supporting said main shaft rotatably;
    wherein a gas bearing is used as a bearing for supporting said main shaft in a thrust direction, spiral grooves are formed in both surfaces of a stationary part of said gas bearing, and said stationary part having said spiral grooves is placed between an upper rotating part and a lower rotating part which are fixed to said main shaft; and
    wherein a thrust magnetic bearing for canceling out a thrust force generated by the differential pressure between a discharge side and an intake side by an evacuation action of said pumping suction is provided, and a vacuum gauge for measuring vacuum pressure in at least one of a pump intake port and an interior of the pump is provided.

14. The turbo vacuum pump according to claim 13, wherein said vacuum gauge comprises a diaphragm gauge, an ionization gauge or a Pirani gauge.

15. The turbo vacuum pump according to claim 13, wherein a displacement sensor for measuring an axial displacement of said main shaft is provided in the vicinity of said thrust magnetic bearing.

16. A turbo vacuum pump comprising:
    a casing;
    a pumping section having rotor blades and stator blades which are disposed alternately in said casing;
    a main shaft for supporting said rotor blades; and
    a bearing and motor section having a motor for rotating said main shaft and a bearing mechanism for supporting said main shaft rotatably;
    wherein a gas bearing is used as a bearing for supporting said main shaft in a thrust direction, spiral grooves are formed in both surfaces of a rotating part of said gas bearing fixed to said main shaft, and said rotating part having said spiral grooves is placed between an upper stationary part and a lower stationary part; and wherein a thrust magnetic bearing for canceling out a thrust force generated by the differential pressure between a discharge side and an intake side by an evacuation action of said pumping suction is provided, and a vacuum gauge for measuring vacuum pressure in at least one of a pump intake port and an interior of the pump is provided.

17. The turbo vacuum pump according to claim 16, wherein said vacuum gauge comprises a diaphragm gauge, an ionization gauge or a Pirani gauge.

18. The turbo vacuum pump according to claim 16, wherein a displacement sensor for measuring an axial displacement of said main shaft is provided in the vicinity of said thrust magnetic bearing.

19. A turbo vacuum pump comprising:
a casing;
a pumping section having rotor blades and stator blades which are disposed alternately in said casing;
a main shaft for supporting said rotor blades; and
a bearing and motor section having a motor for rotating said main shaft and a bearing mechanism for supporting said main shaft rotatably;
wherein a gas bearing is used as a bearing for supporting said main shaft in a thrust direction, spiral grooves are formed in both surfaces of a stationary part of said gas bearing, and said stationary part having said spiral grooves is placed between an upper rotating part and a lower rotating part which are fixed to said main shaft; and
wherein a thrust magnetic bearing for canceling out a thrust force generated by the differential pressure between a discharge side and an intake side by an evacuation action of said pumping suction is provided, and a vacuum pressure measured by a vacuum gauge provided at a pump intake side is inputted into a control section of said thrust magnetic bearing.

20. A turbo vacuum pump comprising:
a casing;
a pumping section having rotor blades and stator blades which are disposed alternately in said casing;
a main shaft for supporting said rotor blades; and
a bearing and motor section having a motor for rotating said main shaft and a bearing mechanism for supporting said main shaft rotatably;
wherein a gas bearing is used as a bearing for supporting said main shaft in a thrust direction, spiral grooves are formed in both surfaces of a rotating part of said gas bearing fixed to said main shaft, and said rotating part having said spiral grooves is placed between an upper stationary part and a lower stationary part; and
wherein a thrust magnetic bearing for canceling out a thrust force generated by the differential pressure between a discharge side and an intake side by an evacuation action of said pumping suction is provided, and a vacuum pressure measured by a vacuum gauge provided at a pump intake side is inputted into a control section of said thrust magnetic bearing.

21. A turbo vacuum pump comprising:
a casing;
a blade pumping section having rotor blades and stator blades which are disposed alternately in said casing;
a main shaft for supporting said rotor blades; and
a bearing and motor section having a motor for rotating said main shaft and a bearing mechanism for supporting said main shaft rotatably;
wherein a gas bearing is used as a bearing for supporting said main shaft in a thrust direction, spiral grooves are formed in both surfaces of a stationary part of said gas bearing, and said stationary part having said spiral grooves is placed between an upper rotating part and a lower rotating part which are fixed to said main shaft; and
wherein a centrifugal blade element for compressing and evacuating gas in a radial direction is formed on at least one of a surface of said lower rotating part having an opposite surface which faces said spiral grooves of said stationary part and a surface of said stator blade which faces said lower rotating part in an axial direction.

22. The turbo vacuum pump according to claim 21, wherein at least a single stage centrifugal blade element for compressing and evacuating gas in a radial direction is provided on said rotor blade or said stator blade which is disposed at a location closer to the discharge side than a location where said centrifugal blade element is formed on said at least one of said lower rotating part and said stator blade.

23. The turbo vacuum pump according to claim 21, wherein a bypass line for connecting said blade pumping section and an interior of the pump at a downstream side of said blade pumping section is provided.

24. The turbo vacuum pump according to claim 23, wherein an opening degree adjustment mechanism is provided in said bypass line.

25. A turbo vacuum pump comprising:
a casing;
a blade pumping section having rotor blades and stator blades which are disposed alternately in said casing;
a main shaft for supporting said rotor blades; and
a bearing and motor section having a motor for rotating said main shaft and a bearing mechanism for supporting said main shaft rotatably;
wherein a gas bearing is used as a bearing for supporting said main shaft in a thrust direction, spiral grooves are formed in both surfaces of a rotating part of said gas bearing fixed to said main shaft, and said rotating part having said spiral grooves is placed between an upper stationary part and a lower stationary part; and
wherein a centrifugal blade element for compressing and evacuating gas in a radial direction is formed on at least one of a surface of said rotor blade having an opposite surface which faces said lower stationary part in an axial direction and a surface of said stator blade which faces said rotor blade in an axial direction.

26. The turbo vacuum pump according to claim 25, wherein at least a single stage centrifugal blade element for compressing and evacuating gas in a radial direction is provided on said rotor blade or said stator blade which is disposed at a location closer to the discharge side than a location where said centrifugal blade element is formed on said at least one of said rotor blade and said stator blade.

27. The turbo vacuum pump according to claim 25, wherein a bypass line for connecting said blade pumping section and an interior of the pump at a downstream side of said blade pumping section is provided.

28. The turbo vacuum pump according to claim 27, wherein an opening degree adjustment mechanism is provided in said bypass line.

* * * * *